US006181253B1

(12) United States Patent
Eschenbach et al.
(10) Patent No.: US 6,181,253 B1
(45) Date of Patent: Jan. 30, 2001

(54) FLEXIBLE MONITORING OF LOCATION AND MOTION

(75) Inventors: Ralph F. Eschenbach, Woodside; James M. Janky, Los Altos, both of CA (US)

(73) Assignee: Trimble Navigation Limited, Sunnyvale, CA (US)

( * ) Notice: Under 35 U.S.C. 154(b), the term of this patent shall be extended for 0 days.

(21) Appl. No.: 09/019,492

(22) Filed: Feb. 5, 1998

Related U.S. Application Data

(63) Continuation of application No. 08/526,989, filed on Dec. 12, 1995, now abandoned, and a continuation-in-part of application No. 08/171,228, filed on Dec. 21, 1993, now Pat. No. 5,568,119.

(51) Int. Cl.[7] .............................. G08B 23/00; G01J 3/48

(52) U.S. Cl. .............................. 340/825.37; 340/825.49; 340/825.54; 340/539; 340/572; 340/573; 342/450; 379/38

(58) Field of Search ......................... 340/825.08, 825.34, 340/825.37, 825.44, 825.49, 825.54, 825.72, 539, 572, 573, 870.18; 256/10; 342/357, 450; 379/38

(56) References Cited

U.S. PATENT DOCUMENTS

| | | | |
|---|---|---|---|
| 3,478,344 | 11/1969 | Schwitzgebel et al. | 340/312 |
| 3,518,376 | 6/1970 | Kamen et al. | 179/15 |
| 3,722,152 | 3/1973 | Schlatter et al. | 52/79 |

(List continued on next page.)

OTHER PUBLICATIONS

Tom Logsdon, "The Navstar Global Positioning System," pp. 1–91, Van Nostrand Reinhold, 1992.

"Loran–C User Handbook," U.S. Department of Transportation, U.S. Coast Guard, Commandant Publication P16562.5, Nov. 1992.

(List continued on next page.)

*Primary Examiner*—Alpus H. Hsu
(74) *Attorney, Agent, or Firm*—Wagner, Murabito & Hao LLP

(57) ABSTRACT

Method and apparatus for monitoring the present location of a person ("confinee") who is to be confined to a designated site, which site can have a diameter as small as a few meters or as large as several kilometers. The present location of the confinee is checked at selected time intervals with time periods ranging from one second to thousands of seconds, as desired. The confinee wears a location-determining ("LD") unit that receives electromagnetic signals that contain information allowing determination of the present location of the LD unit, and thus of the confinee, from three or more non-collinear outdoor LD signal sources and from three or more non-collinear indoor LD signal sources. The indoor LD signal sources may be radiowave transmitters. The outdoor LD signal sources may be transmitters for a Loran, Omega, Decca, Tacan, JTIDS Relnav or PLRS or similar ground-based system, or transmitters for a satellite positioning system, such as OPS or GLONASS. The relative phases or transmission times for the signals from each indoor LD signal source are determined and provided for the LD unit. The present location or change location of the LD unit is determined and compared with the permitted site location coordinates at a sequence of selected times to determine if the confinee is present at the site at such times. The LD unit issues an alarm signal if the confinee is not on the site and has not arranged beforehand to leave the permitted site for a selected time interval, The permitted site can be redefined, for a selected time interval, to include the first permitted site, a second permitted site and a corridor extending between the first and second permitted sites for a selected time interval, after which the permitted site can be changed again to include only the first or the second permitted site or a portion thereof. This allows the confinee to temporarily leave the original permitted site to seek medical attention or to attend to other needs, or to be moved permanently to the second site. The permitted site can be redefined at any time and for any subsequent time interval. One or more exclusion sites can be designated where the confinee is not permitted to go at any time.

28 Claims, 18 Drawing Sheets

U.S. PATENT DOCUMENTS

| | | | |
|---|---|---|---|
| 3,889,264 | 6/1975 | Fletcher et al. | 343/105 R |
| 4,054,880 | 10/1977 | Dalabakis et al. | 343/112 R |
| 4,495,496 | 1/1985 | Miller, III | 340/825.54 |
| 4,571,904 | 2/1986 | Kessler et al. | 52/205 |
| 4,596,988 | 6/1986 | Wanka | 343/457 |
| 4,646,290 | 2/1987 | Hills | 370/84 |
| 4,651,156 | 3/1987 | Martinez | 342/457 |
| 4,651,157 | 3/1987 | Gray et al. | 342/457 |
| 4,660,193 | 4/1987 | Young et al. | 370/11 |
| 4,747,120 | 5/1988 | Foley | 379/38 |
| 4,777,477 | 10/1988 | Watson | 340/573 |
| 4,782,531 | 11/1988 | Karr et al. | 381/14 |
| 4,799,062 | 1/1989 | Sanderford, Jr. et al. | 342/450 |
| 4,816,769 | 3/1989 | Ma et al. | 329/50 |
| 4,843,377 | 6/1989 | Fuller et al. | 340/573 |
| 4,894,662 | 1/1990 | Counselman | 342/357 |
| 4,914,735 | 4/1990 | Ichiyoshi | 342/125 |
| 4,918,425 | 4/1990 | Greenberg et al. | 340/539 |
| 4,918,432 | 4/1990 | Pauley et al. | 340/573 |
| 4,924,211 | 5/1990 | Davies | 340/573 |
| 4,952,928 | 8/1990 | Carroll et al. | 340/825.54 |
| 4,973,944 | 11/1990 | Maletta | 340/568 |
| 4,980,671 | 12/1990 | McCurdy | 340/568 |
| 4,999,613 | 3/1991 | Williamson et al. | 340/573 |
| 5,023,901 | 6/1991 | Sloan et al. | 379/38 |
| 5,023,934 | 6/1991 | Wheeless | 455/45 |
| 5,045,861 | 9/1991 | Duffett-Smith | 342/457 |
| 5,051,741 | 9/1991 | Wesby | 340/825.49 |
| 5,052,048 | 9/1991 | Heinrich | 455/66 |
| 5,073,784 | 12/1991 | Westfall | 342/465 |
| 5,075,670 | 12/1991 | Bower et al. | 340/573 |
| 5,117,222 | 5/1992 | McCurdy et al. | 340/573 |
| 5,121,096 | 6/1992 | Moore et al. | 340/326 |
| 5,146,207 | 9/1992 | Henry et al. | 340/573 |
| 5,153,584 * | 10/1992 | Engira | 340/870.18 |
| 5,170,426 | 12/1992 | D'Alessio et al. | 379/38 |
| 5,170,487 | 12/1992 | Peek | 455/45 |
| 5,173,710 | 12/1992 | Kelly et al. | 342/463 |
| 5,189,395 | 2/1993 | Mitchell | 340/539 |
| 5,193,213 | 3/1993 | Chon | 455/45 |
| 5,206,897 | 4/1993 | Goudreau et al. | 379/38 |
| 5,218,344 | 6/1993 | Ricketts | 340/573 |
| 5,255,306 | 10/1993 | Melton et al. | 379/38 |
| 5,266,944 | 11/1993 | Carroll et al. | 340/825.36 |
| 5,280,295 | 1/1994 | Kelley et al. | 342/463 |
| 5,298,884 | 3/1994 | Gilmore et al. | 340/573 |
| 5,396,215 | 3/1995 | Hinkle | 340/426 |
| 5,396,379 | 3/1995 | Mayo | 360/78.07 |
| 5,412,379 | 5/1995 | Waraksa et al. | 340/825.72 |
| 5,434,984 | 7/1995 | Deloddere et al. | 395/325 |
| 5,471,197 | 11/1995 | McCurdy et al. | 340/573 |
| 5,497,149 | 3/1996 | Fast | 340/988 |
| 5,499,032 | 3/1996 | Kelley et al. | 342/357 |
| 5,568,119 * | 10/1996 | Schipper et al. | 340/825.37 |
| 5,724,025 * | 3/1998 | Tavori | 340/573 |
| 5,905,436 * | 5/1999 | Dwight et al. | 340/573.1 |
| 5,917,414 * | 6/1999 | Oppelt et al. | 340/573.1 |

OTHER PUBLICATIONS

"Navstar GPS Space Segment/Navigation User Interfaces," Interface Control Document GPS(200), No. ICD–GPS–200, Rockwell International, Satellite Systems Division, Rev. B–PR, IRN–200B–PR–001, Apr. 16, 1993.

* cited by examiner

FLEXIBLE MONITORING OF LOCATION AND MOTION

This is a continuation of application Ser. No. 08/526,989 filed on Dec. 12, 1995, now abandoned which is hereby incorporated by reference to this specification.

FIELD OF THE INVENTION

This application is a continuation in part of an earlier-filed patent application entitled "Flexible Site Arrestee Monitoring," U.S. application Ser. No. 08/171,228, now U.S. Pat. No. 5,568,119. This invention relates to monitoring the location and movement of site arrestees or confinees in an arbitrarily defined area, using radiowave communications.

BACKGROUND OF THE INVENTION

The annual growth of the population of prisoners within the state and federal prisons in the United States has averaged several percent per year for the last ten years. The total number of such prisoners exceeds 2 million. All felons convicted and sentenced for a crime are placed in one or another of these prisons, with little regard for the severity of the crime, whether the crime involved actual or threatened violence, or whether the crime was primarily directed against property. This approach has several disagreeable consequences. First, the federal and state governments cannot build prisons fast enough to accommodate the growing prison population, and some courts are treating prison overcrowding as a violation of the prisoners' constitutional rights. Second, the amount of fully-burdened money spent on new prisons, estimated to be $80,000–100,000 per cell, is now a substantial part of the annual budget of state and federal governments. The State of California now spends more on incarceration of prisoners than on education of University of California students. Third, prisons must be built in relatively large sizes to obtain economies of scale so that siting of such prisons is often a problem. Fourth, the average cost of providing room, board, recreation and security for a prisoner is now estimated to be about $24,000 per year, and this cost increases with inflation. Fifth, prisoners convicted of non-violent crimes are usually thrown together with, and are often preyed upon by, prisoners convicted of violent crimes. Sixth, prisoners who might still work and make a positive contribution to society are discouraged or prevented from doing so because of a lack of facilities needed for such activities.

Some workers have conceived other ways of handling some of these problems by providing portable jail or prison cells or by providing monitoring tags that must be worn by the prisoners. One early device, disclosed in U.S. Pat. No. 3,478,344, issued to Schwitzgebel et al, provides an omnidirectional transceiver carried on the waist and an encoded oscillator, uniquely identifying the wearer, that communicates with the transceiver. An inmate or other supervised person in a mental institution or a prison wears this apparatus, which receives signals transmitted from a nearby central station that interrogates the wearer's unit concerning the location of the unit. The unit responds automatically. The method used for determination of location of the wearer's unit might be triangulation, which would require provision of at least three additional stations. Miller, in U.S. Pat. No. 4,495,496, discloses a-similar approach for locating miners working a in different shafts in a mine. Engira, in U.S. Pat. No. 5,153,584, discloses a similar approach for monitoring the location and status of ambulatory electrocardiogram patients in a medical facility.

Schlatter et al, in U.S. Pat. No. 3,722,152, disclose a portable jail cell that can be transported as a disassembled unit and then assembled and used within a jail or other designated security area. The cell walls and floor are made of metal and concrete, and two or more such portable cells can be placed side-by-side to conserve space. A portable cell must be placed within a jail or other secured facility to provide overall security.

In U.S. Pat. No. 4,571,904, Kessler et al disclose a patient enclosure, to be placed within and form part of a hospital room, that operates similarly to the portable cell of Schlatter et al. The patient enclosure is a separate room-within-a-room that is cleared of all furniture except the patient's bed, may include padding on the walls, and is intended to be used for patients with brain damage who must be protected from further injury by their own actions.

A location determination (LD) unit for a vehicle, relying on radiowave triangulation signals provided by an Automatic Direction Finder system, is disclosed by Wanka in U.S. Pat. No. 4,596,988. The on-board unit transmits its present location when the LD unit is interrogated by receipt of a signal broadcast by a central station, which can track the locations of several vehicles simultaneously.

Gray et al disclose a vehicle security and tracking system in U.S. Pat. No. 4,651,157. An LD unit, installed in a vehicle to be tracked, receives Loran-C signals and transmits the information in these signals, unprocessed, to a central station for determination of the vehicle's present location by triangulation. The system also monitors the values of selected parameters associated with vehicle operation and transmits an advisory signal to the central station if the value of one or more of these parameters lies outside its permitted range.

A personnel monitoring system that uses the telephone for communication between the person whose location is monitored and a central station is disclosed in U.S. Pat. No. 4,747,120, issued to Foley. The monitored person wears a bracelet and is occasionally required to take some action, such as insertion of the bracelet into a decoder that transmits a coded verification signal to the central station over a dedicated phone line that is enabled only when used. The system is provided with some means that does not allow transmission of false signals to the central station.

Watson, in U.S. Pat. No. 4,777,477, discloses a location surveillance system for a designated person, such as a parolee, that detects departure of that person from a designated site, such as an enclosed building. The person wears a sensor-transmitter, a wrist band and a current-carrying loop wrapped around the body. The sensor senses when the person leaves the building and causes the transmitter to broadcast an alarm that is received by a receiver located within the building. The system senses an attempt to remove the loop from the body, using strain gauge apparatus, and transmits another alarm signal.

U.S. Pat. No. 4,918,425, issued to Greenberg et al, discloses a monitoring system for a selected object, such as a vehicle, a person, an animal or an inanimate object. The selected object carries a transponder, with a unique identification code, that receives an interrogation signal at regular intervals, specifying its ID code, from a base station, which may be portable. The transponder then transmits a coded signal that is received by the base station, indicating that the transponder is close enough to have received and understood the interrogation signal. If the base station fails to receive the coded signal responding to its own interrogation signal within a specified time interval, the base station can cause a search to be initiated for the object, which may be a child.

A similar system, which relies upon a network of stations to receive and forward the response signal to a designated base station, is disclosed in U.S. Pat. No. 5,051,741, issued to Wesby.

A house arrest monitoring system, using an identification tag that is worn near the flesh of the prisoner under house arrest, is disclosed in U.S. Pat. No. 4,918,432, issued to Pauley et al. A tag worn by a prisoner transmits a signal having a unique code portion that identifies that prisoner so that several prisoners can be sequestered at one site. A field monitoring device (FMD), connected to a telephone line, receives and analyzes these transmitted signals and determines if (1) the prisoner is present at the site and (2) the tag is being continuously worn near the flesh of the wearer. If one or the other of these conditions is not true, the FMD communicates this information to a central processing unit (CPU), using the telephone line, and personnel at this CPU respond accordingly. The intensity of the signal transmitted by the tag may be improved using a signal repeater to communicate with the FMD. One CPU is used to monitor the locations of prisoners at one or several house arrest sites. The presence of a prisoner at the site is determined primarily by receipt of a tag signal having that prisoner's code included. A prisoner, wearing a tag, could move away from the site a considerable distance before the FMD would sense this, because the location of a tag cannot be determined with much accuracy.

U.S. Pat. No. 4,952,928, issued to Carroll et al, discloses a presence monitoring and identification system, including a body condition sensor and transponder to be worn by the monitored person. In response to receipt of a radiowave request, the transponder transmits a signal to a field monitoring device (FMD), identifying the wearer and including information sensed by the body sensor, such as heart rate, skin perspiration, muscle movement, etc. The FMD is located near where the monitored person should be and periodically transmits to a central station body information on, and the location of, the monitored person. The system is intended to monitor the condition and location of a person under house arrest.

Williamson et al, in U.S. Pat. No. 4,999,613, disclose a remote confinement system in which a sequence of different, unsupervised tests are conducted on prisoners confined at a site. The tests are intended to determine the identity of a prisoner, whether a given person is present or absent at the site, and certain characteristics of the conduct of a prisoner at the site (e.g., a prisoner's sobriety). A radio transmitter, worn on the leg of each prisoner, transmits signals containing these data, which is received by an adjacent home monitoring unit, then relayed over a telephone line to a central station where these data are collected and analyzed. The present location of a prisoner cannot be accurately determined, for reasons similar to those that characterize the Pauley et al invention discussed above. U.S. Pat. No. 4,843, 377, issued to Fuller et al, discloses a system that is similar to the Williamson et al patent, using breath alcohol testing and body fluid testing and verification of the prisoner identity by voice- print, graphic image matching or other means.

U.S. Pat. No. 5,052,048, issued to Heinrich for a crime deterrent system, discloses passive pursuit of a suspected perpetrator of a recent crime. Each of a plurality of citizens is provided with a short range FM or AM radio transmitter, tuned to a selected frequency for communication with a central control station. These citizens are alerted to the presence of the suspected perpetrator by a broadcast from the central station. Each such citizen that sights the suspected perpetrator transmits a report to the central station, indicating the suspected perpetrator's present location and direction of movement. The central station maps the movement of the suspected perpetrator and moves to apprehend that person.

A personnel monitoring tag with tamper detection for a person under house arrest is disclosed by Bower et al in U.S. Pat. No. 5,075,670. The tag contains a small radio transmitter that intermittently broadcasts a relatively weak signal that is received by a receiver located on the assigned site. If the arrestee leaves the site, the broadcast signal will become weaker and eventually will not be received by the receiver, in which event an alarm can be given. The tag is provided with a tamper detection circuit. The tag broadcasts a normal signal when the tag has not been tampered with and broadcasts a distinguishable tamper signal when tampering is detected. This apparatus has many interesting features, but it cannot accurately determine the location of an arrestee or detect whether the arrestee stays within a boundary defining the designated site.

A tamper indicator system including a conductive strap that is placed around a limb of a house arrestee is disclosed in U.S. Pat. No. 5,117,222, issued to McCurdy et al. When the strap is put into place, electricity is conducted through a circuit and causes a pulse counter to decrement to a selected minimum number, such as zero, over an initial strap placement period. If tampering or attempted strap removal occurs during this initial strap placement period, a transmitter notifies a monitoring person of this event.

Moore et al, in U.S. Pat. No. 5,121,096, disclose a person locator system that includes an appliance to be worn by a child or by a person with impaired senses. The appliance carries its own power supply and transmits a visual signal and an audible signal (70 dB at 2500 Hz) at selected times, such as every five seconds. The audible signal can, allegedly, be heard at 300 feet. However, this only locates the person wearing the appliance within a circle of area about 283,000 square feet, and the area covered is limited by long-term tolerance for high intensity sounds (about 85 dB). Further, this requires that a another person continuously monitor the varying level of the audible sound periodically emitted by the appliance.

Henry et al, disclose an electronic house arrest system that uses optical links and infrared communications, in U.S. Pat. No. 5,146,207. A prisoner wears apparatus that serves as transmitter and as receiver, using two concealed apertures in the apparatus. This apparatus communicates with a field monitoring device (FMD) that, in turn, communicates with a central station that receives and analyzes the data collected by the FMD. Data collected and the means of communication (telephone or modem) are similar to those disclosed in the Pauley et al patent.

In U.S. Pat. No. 5,170,426, D'Alessio et al disclose a home incarceration system that incorporates voice analysis and verification over a telephone line. The voice of a prisoner who is added to this home arrest system is initially tested to establish a voice template that subsequently can be used to verify voice communication over a phone line by that prisoner. The prisoner communicates with a central office at irregular times by phone calls, and central office apparatus verifies the location and identity of the call responder (prisoner), using the voice template and other characteristics. The location of the prisoner during the time intervals between these phone calls is not determined with this system.

An electronic house arrest system disclosed by Mitchell in U.S. Pat. No. 5,189,395 allows silent calls for assistance from a monitoring officer who makes personal and/or telephone-assisted checks of the presence and identity of prisoners at designated sites. In other respects, this system is similar to the system disclosed in the Pauley et al patent.

A telephone-based home incarceration system in which the prisoner wears a bracelet or other appliance is disclosed by Goudreau et al in U.S. Pat. No. 5,206,897. The bracelet contains an electrical circuit that has specified electrical characteristics that are monitored by an adjacent comparator circuit. If the sets of electrical characteristics do not match, indicating that the prisoner may be absent from the site of incarceration, a central station is notified by phone and appropriate action is taken. Verification of the presence and identity of the prisoner must be requested by placing a telephone call to the prisoner, who then places the bracelet in a special fixture to implement comparison of the electrical characteristics. This verification procedure probably could not be done more often than about once per hour, if the central office has many prisoners to monitor using this system.

Melton et al disclose use of a cellular interface unit for an electronic house arrest system, in U.S. Pat. No. 5,255,306. A field monitoring device (FMD) is positioned at the house arrest site and receives low power, uniquely tagged signals transmitted by a tamper-proof house arrest appliance worn by the arrestee. The FMD monitors the strength of the signals received from the appliance. When the signal strength falls below a selected threshold, the monitoring system determines that the arrestee has moved off the site, and a cellular phone network is used to alert the proper authorities at a central station. The FMD signal threshold is typically set corresponding to a separation distance of 150 feet and cannot distinguish from which direction the signals arrive.

U.S. Pat. No. 5,412,379, issued to Waraksa et al, discloses a keyless entry system, for use in automatically unlocking (or locking) a vehicle as the vehicle operator approaches (or moves away). The operator carries a portable beacon device whose beacon signal is received by a receiver in the vehicle. The beacon device includes a motion sensor that shuts down the beacon signal top conserve battery life when the beacon device is not moving.

FM subcarrier signals and AM carrier signals have been used for some types of radiowave communications. In U.S. Pat. No. 3,889,264, Fletcher discloses a vehicle location system in which the unsynchronized AM carrier signals from three or more AM radio stations form hyperbolic isophase grid lines that are used to determine location of a vehicle. The vehicle must be equipped with a three-channel, tunable receiver, and its location must be referenced to an initial known location by counting the number of isophase lines crossed after the vehicle leaves the initial location. Isophase drift is compensated for by subtraction from the count.

Dalabakis et al, in U.S. Pat. No. 4,054,880, disclose a radio navigation and vehicle location system employing three low frequency subcarrier signals received from three radio stations at a three-channel, tunable receiver located on the vehicle. Isophase lines crossed are counted after the vehicle leaves an initial known location. This system, like the Fletcher system, is a delta-position system that determines vehicle location only relative to an initially known location.

U.S. Pat. No. 4,646,290, issued to Hills, discloses use of F.C.C.-approved Subsidiary Communication Authorization (SCA) FM subcarrier signals for one way transmission. This patent discloses transmission of a plurality of messages, which may be delivered to the transmitter at a wide range of bit rates, to be transmitted at a single bit rate that is at least as large as the highest bit rate for message delivery. This method allows for downstream insertion of additional data.

An integrated radio location and communication system for a mobile station is disclosed by Martinez in U.S. Pat. No. 4,651,156. Each mobile station carries a transceiver that issues radio signals that are received by two or more signal transceiver reference sites having fixed, known locations. The transceivers at the mobile station and the reference stations are continuously phase locked to the RF carrier signal from a nearby commercial radio station. The radio station and the mobile station each transmit a brief, distinguishable range tone at a known sequence of times, and the range tone from each station is received by each reference station. From an analysis of the differences in arrival times of the range tones received from the radio station and from the mobile station, the reference stations determine the two-dimensional location of the mobile station. The mobile station uses the beat signal between two RF subcarrier frequencies to generate its range tone signal and to distinguish that mobile station transmissions from the transmissions of any other mobile station.

Young et al, in U.S. Pat. No. 4,660,193, discloses use of two SCA FM subcarrier signals, the first being amplitude modulated and the second being phase modulated, to provide a digital data transmission system. A subcarrier signal within this system may also be modulated to carry audio signals.

A multichannel FM subcarrier broadcast system that provides a sequence of relatively closely spaced channels, using independent sidebands of suppressed carriers, is disclosed by Karr et al in U.S. Pat. No. 4,782,531. The sideband signals are generated in pairs and are phase shifted before transmission. Upon receipt of the transmitted signals, the process is reversed. An earlier patent, U.S. Pat. No. 3,518,376, issued to Caymen and Walker, discloses a similar approach without use of signal phase shifting of pairs of sideband signals.

In U.S. Pat. No. 4,799,062, Sanderford et al disclose a radio location method that uses a central processing station, a plurality of signal repeater base stations with fixed, known locations, and a mobile station with a known location at any time. The central station transmits a master grid synchronization pulse, which serves as a time reference, to the other stations at a selected sequence of times. A roving station with unknown location transmits a pulse that is received by three or more base stations and is retransmitted to the central station. The central station determines the location of the roving station using the differences in time of arrival at each base station of the pulse transmitted by the roving station. The mobile station also transmits a pulse from time to time, and its known location is compared with its computed location by the central station to determine any multipath compensation required to reconcile the known and computed locations of the mobile station. The multipath compensation for a mobile station adjacent to the roving station is applied to correct the computed location of the roving station.

Ma, in U.S. Pat. No. 4,816,769, discloses receipt of SCA FM subcarrier signals for digital data paging at a radio receiver. The system measures signal-to-noise ratio of an output amplitude of a Costas loop, used to phase lock to the FM subcarrier frequency, to determine if the signal is sufficiently strong to be processed.

A system for detection of radiowave propagation time, disclosed by Ichiyoshi in U.S. Pat. No. 4,914,735, uses detection of phase differences for transmission of the signal over M (≧2) different known signal paths to a target receiver. The transmitted signal includes a subcarrier signal, having a frequency that is higher than the transmitter clock frequency, modulated with a known modulation signal. The receiver has M demodulators for the signals received by the M different paths and has a phase comparator to compare the computed phases for each of these received signals. The phase differences are proportional to the signal path length differences, if compensation for transmission line distortions is included.

U.S. Pat. No. 5,023,934, issued to Wheeless, discloses a system for communication of graphic data using radio subcarrier frequencies. The data are broadcast on a subcarrier channel and received by a radio receiver that is connected to a computer. The computer receives the subcarrier signals, displays the graphic data on a computer screen, and performs other functions, such as transmission error checking and modification of the displayed graphic data. The system is intended for weather data communication and display.

Westfall, in U.S. Pat. No. 5,073,784, discloses a system for location of a transmitter ("unknown") at large distances, using a large network of pairs of spaced apart radiowave receivers whose locations are known and whose relative phases are synchronized. A signal, broadcast by the unknown transmitter at less than HF frequencies, is received at different time and space points by pairs of receivers. Simple geometrical computations allow determination of the location of the unknown transmitter by comparing times of arrival of the transmitted signal.

U.S. Pat. No. 5,170,487, issued to Peek, discloses use of FM sub-carrier signals for a pager system for mobile users. A plurality of transmitters are used, each of which transmits an FM subcarrier signal or a carrier signal modulated with a chosen message signal, slightly offset in time. Each page-receiving unit is assigned a time slot, during which the receiving unit dials through the set of frequencies corresponding to the FM subcarrier and modulated-carrier signals to determine if a page message has been sent for that mobile user.

A system that allows determination of an absolute location of a vehicle is disclosed by Kelley et al in U.S. Pat. No. 5,173,710. FM subcarrier signals are received from three radio stations with known locations but unknown relative phases by signal processors at the vehicle and at a fixed station with known location relative to the three radio stations. The fixed station processor determines the relative phases of the three radio stations FM subcarrier signals and broadcasts this relative phase information to the vehicle. The vehicle processor receives this relative phase data and determines its absolute location, using the phases of the FM signals it senses at its own location.

Chon, in U.S. Pat. No. 5,193,213, discloses an FM broadcast band system for receipt of relatively high frequency FM subcarrier signals. A tunable high pass receiver first circuit receives the carrier and a tunable low pass second circuit receives the subcarrier signal Each signal can then be separately processed.

A navigation and tracking system using differential Loran-C or differential Decca signalling is disclosed by Duffett-Smith in U.S. Pat. No. 5,045,861. A reference station transmits a reference signal to a mobile station and to three or more local Loran-C or Decca (fixed) stations having known locations relative to the reference station. The fixed stations retransmit the reference signal to the mobile station, where the phase received signal differences are compared to determine the location of the mobile station.

Most of these systems use a single communication system that may not work in all indoor environments or in all locations outdoors, rather than integrating two or more communication systems to provide information on the location and/or velocity of movement of a mobile user. What is needed is an integrated location determination system for automatically or discretionarily determining the present location and/or present velocity of a mobile user at a designated site, whether the user is presently outside or inside a building or other structure. Preferably, the system should include an appliance to be worn or carried by an arrestee or confinee (collectively referred to as an "monitored person" or "MP" herein) that will: (1) allow selected MPs to live on designated sites outside a conventional confinement facility for at least a portion of their confinement time; (2) detect with reasonable accuracy the present location and/or present motion of the MP at arbitrarily chosen times with time interval lengths as short as one second; (3) detect when tampering with the appliance is occurring and provide another alarm; (4) allow the MP to leave the designated site at prescribed times to seek medical attention or attend to other needs, while continuing to monitor the present location of the MP; (5) allow easy and flexible redefinition of a boundary of a designated site; and (6) provide these features with reduced use of electrical power.

SUMMARY OF THE INVENTION

These needs are met by the invention, which provides a system and associated apparatus that allows a monitored person (MP) to be confined to a designated site outside a conventional confinement facility for at least a portion of the MP's confinement time. The MP wears a location-determining and motion-sensing (LMD) unit that preferably cannot be removed, except by specially trained persons, and that provides information on the MP's present location coordinates and/or present velocity coordinates at each of a sequence of time intervals that may vary in length from a fraction of a second to hundreds or thousands of seconds, as desired. This LMD unit receives radiowave or similar signals that provide information used to determine the present location and/or sense motion of the LMD unit, and the wearer thereof. The inaccuracy of this present location information is preferably no greater than 1–5 meters and may be as small as a few centimeters.

In one embodiment, the appliance processes this information, determines this present location and/or present motion, and transmits this information to a central station that monitors the present location and/or present motion of one or many MPs, each of whom may be located at a single site or at separate sites. In another embodiment, the LMD unit does not process this information, or partly processes this information, and transmits this information to the central station for further processing to determine the present location of the MP. The central station compares the present location and/or motion of the MP with the designated site and its boundary to determine if the MP is staying on this site, or if the MP has crossed the site boundary into another region. If the MP has moved off the site without prearranged permission, or if no intelligible LMD response signal is received at the proper times, the central station promptly notifies the appropriate authorities. Alternatively, the central station can activate some portion of the appliance worn by the MP and temporarily disable the MP until the authorities arrive.

If the MP moves inside and remains within a building or other structure that interferes with receipt of LMD signals by the LMD unit, the MP may be permitted to move within an approximate sphere of a selected radius $d_{sep}$ without requiring further location or velocity monitoring by the LMD unit. The LMD unit then enters a sleep mode. The sphere radius $d_{sep}$ may be chosen large enough to include a portion of or all of the structure. When the MP moves beyond this sphere or moves outside the structure, the MP is required to "check in" or to otherwise re-activate or re-initiate receipt and analysis of LMD signals by the LMD unit.

Optionally, the LMD unit contains a tamper detection circuit that transmits a distinguishable alarm if tampering is detected. Optionally, the appliance transmits the present location information in an encrypted form that cannot be read or interfered with by the MP, except by making the transmitted signal unintelligible and thus triggering an alarm at the central station.

The MP is permitted, by arrangement beforehand, to travel to a specified secondary site that is beyond the boundary of the primary site of confinement, using a well-defined corridor that connects the primary and secondary sites, when the MP attends to personal needs, such as visits to a physician, a dentist, a food store or the like. In this instance, the MP is given a selected time interval $t_{depart} \leqq t \leqq t_{return}$ in which to travel within the corridor to the secondary site, transact appropriate business at the secondary site, and return to the primary site using the corridor.

The LMD unit carried on the MP's body or garments may receive FM subcarrier signals from a plurality of three or more subcarrier transmitters with known locations and determinable phase relationships. The phase differences of the sub-carrier signals provide information to determine the present location of the LMD unit.

The LMD unit may alternatively, or also, receive radiowave signals from an "outdoor LMD system", including a plurality of three or more ground-based location determination signal sources, such as Loran, Omega, Decca, Tacan, JTIDS Relnav, Personal Location Reporting System (PLRS), or including a plurality of satellite-based location determination signal sources (SATPS), such as GPS or GLONASS, with known locations and determinable phase relationships, using phase analyses similar to analyses used for the FM subcarrier signals. Other sets of three or more radiowave signals with known source locations and selected signal parameters may also be used. The FM subcarrier unit or the outdoor LMD unit may be used by itself, or these two units may be integrated in an LMD unit that receives FM subcarrier signals and outdoor LMD signals. The central station or another station can serve as a reference station and the appliance can serve as a mobile station in a differential positioning mode using the outdoor LMD system.

DESCRIPTION OF BEST MODE OF THE INVENTION

Figure 1:
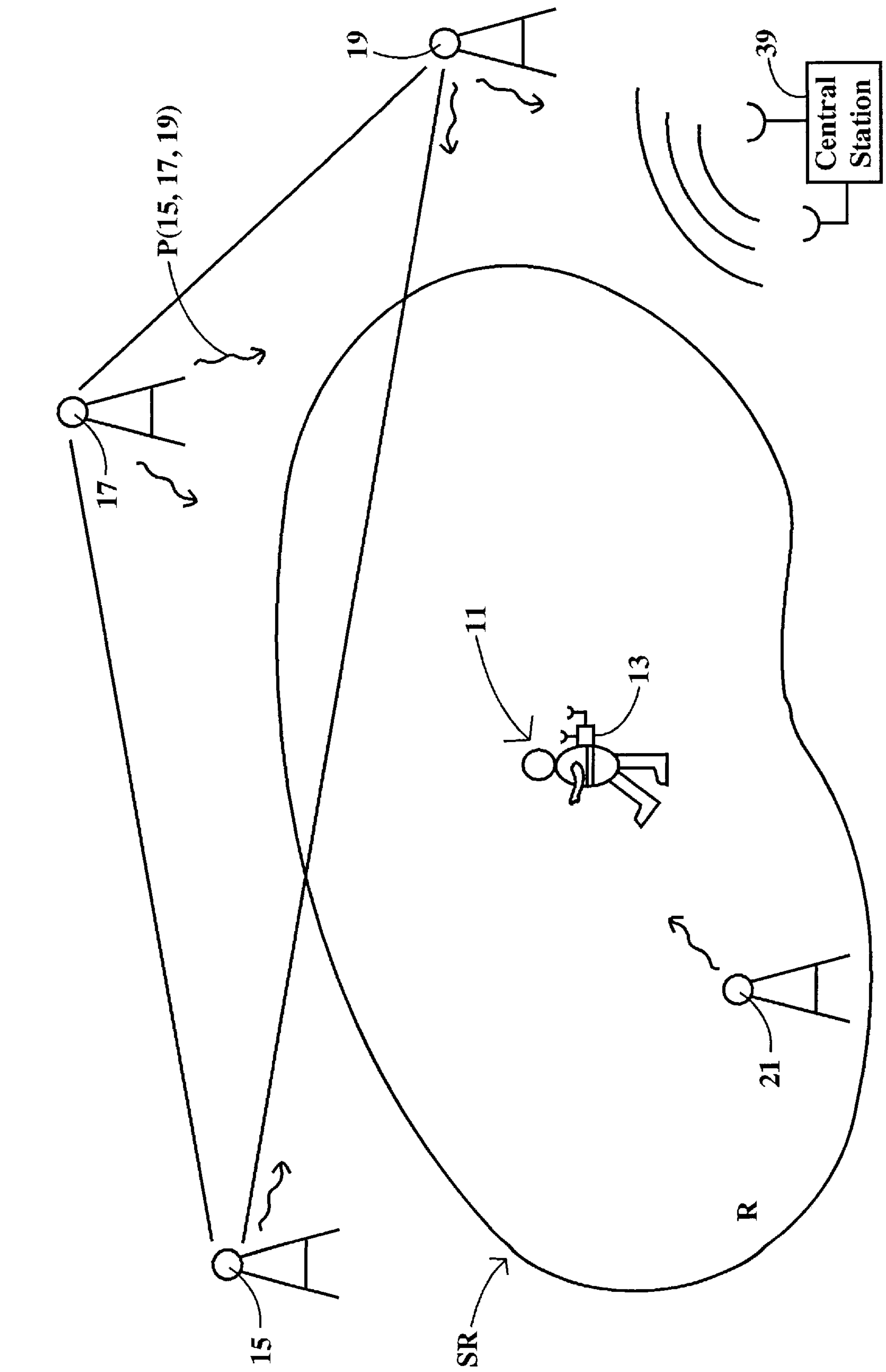
FIG. 1 is a schematic view of operation of one embodiment of the invention in a designated region or site R.

FIG. 1 illustrates practice of one embodiment of the invention. A monitored person (MP) 11 lives and works at or is confined to a designated site or region R having a boundary δR. The MP 11 wears a portable location determination and motion sensing (LMD) unit 13. The LMD unit 13 may receives FM signals from three or more FM signal sources 15, 17, 19, and 21 (optional) that have locations with known location coordinates $(x_m, y_m, z_m)$ for FM signal source no. m (m=15, 17, 19, 21). The FM subcarrier signal of interest may have an associated frequency of about $f_c \pm 19$ kHz, where $f_c$ is the FM carrier frequency that lies in the range 88–108 MHz. Alternatively, a higher order displacement from the carrier frequency (e.g., $f_c \pm 38$ kHz or $f_c \pm 57$ kHz) may be used. The sources of these FM subcarrier signals may be a plurality of FM broadcasting stations located in or near the site R. In this event, the subcarrier signals are obtained by filtering the total FM signals (carrier signal plus message signal plus subcarrier signal) to remove all but a subcarrier signal of a chosen frequency.

Figure 2:
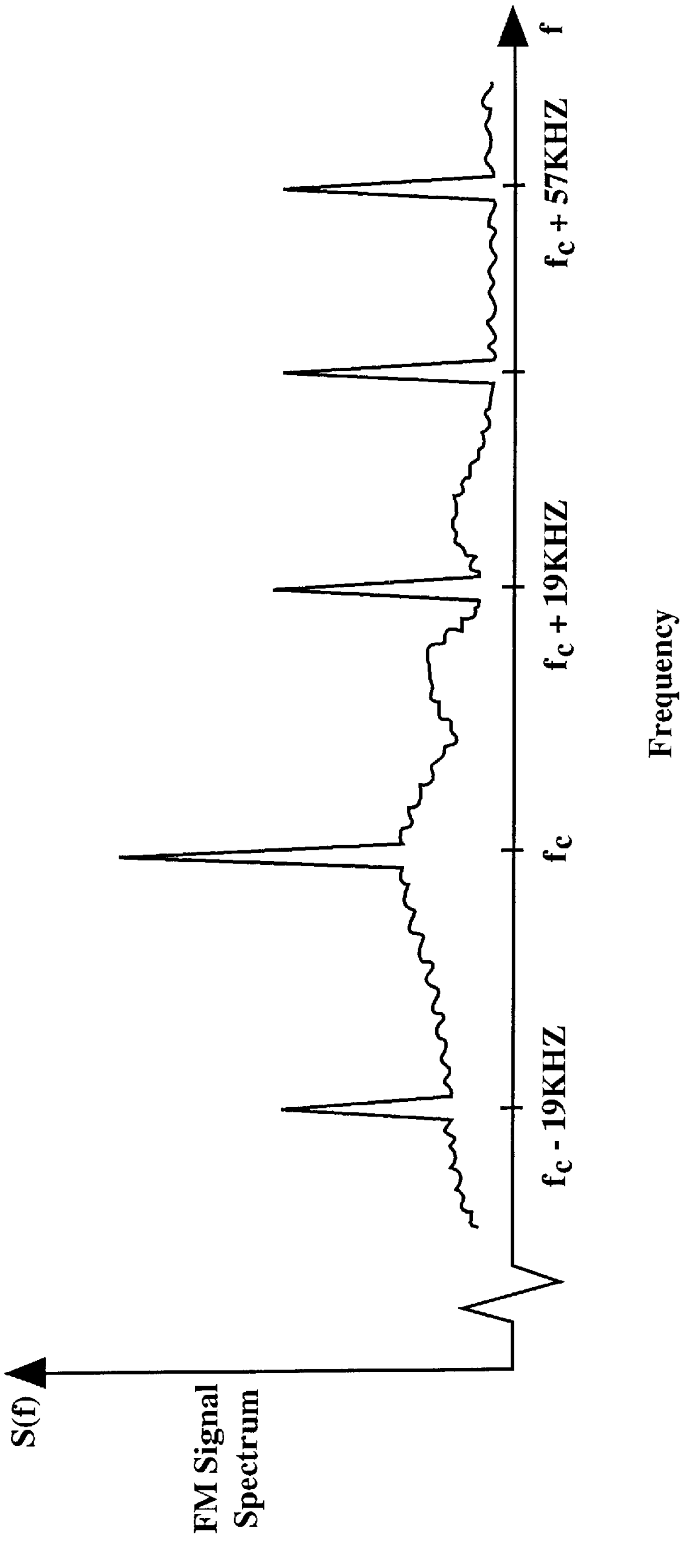
FIG. 2 is a graph illustrating a typical FM signal spectrum near the carrier frequency $f_c$ used for that signal.

FIG. 2 illustrates the full FM signal spectrum and the useful portion of the signal that remains (e.g., $f_c \pm 19$ kHz) after frequency filtering. FM subcarrier signals can be used for all monitoring of the present location of the MP 11, inside and outside buildings and other structures. This approach has the advantage of simplicity: only one set of radiowaves is used for location determination. FM signals are less subject to noise and other interference than are other signals, such as AM signals. Alternatively, an FM subcarrier signal can be replaced by an AM subcarrier signal, which is obtained by filtering an AM signal at a frequency displaced from the AM carrier frequency by a relatively small amount. More generally, determination of the present location and/or present velocity of the MP 11 can be made using a portable LMD unit that receives and analyzes LMD radiowave signals transmitted from three or more LMD signal sources.

Figure 3:
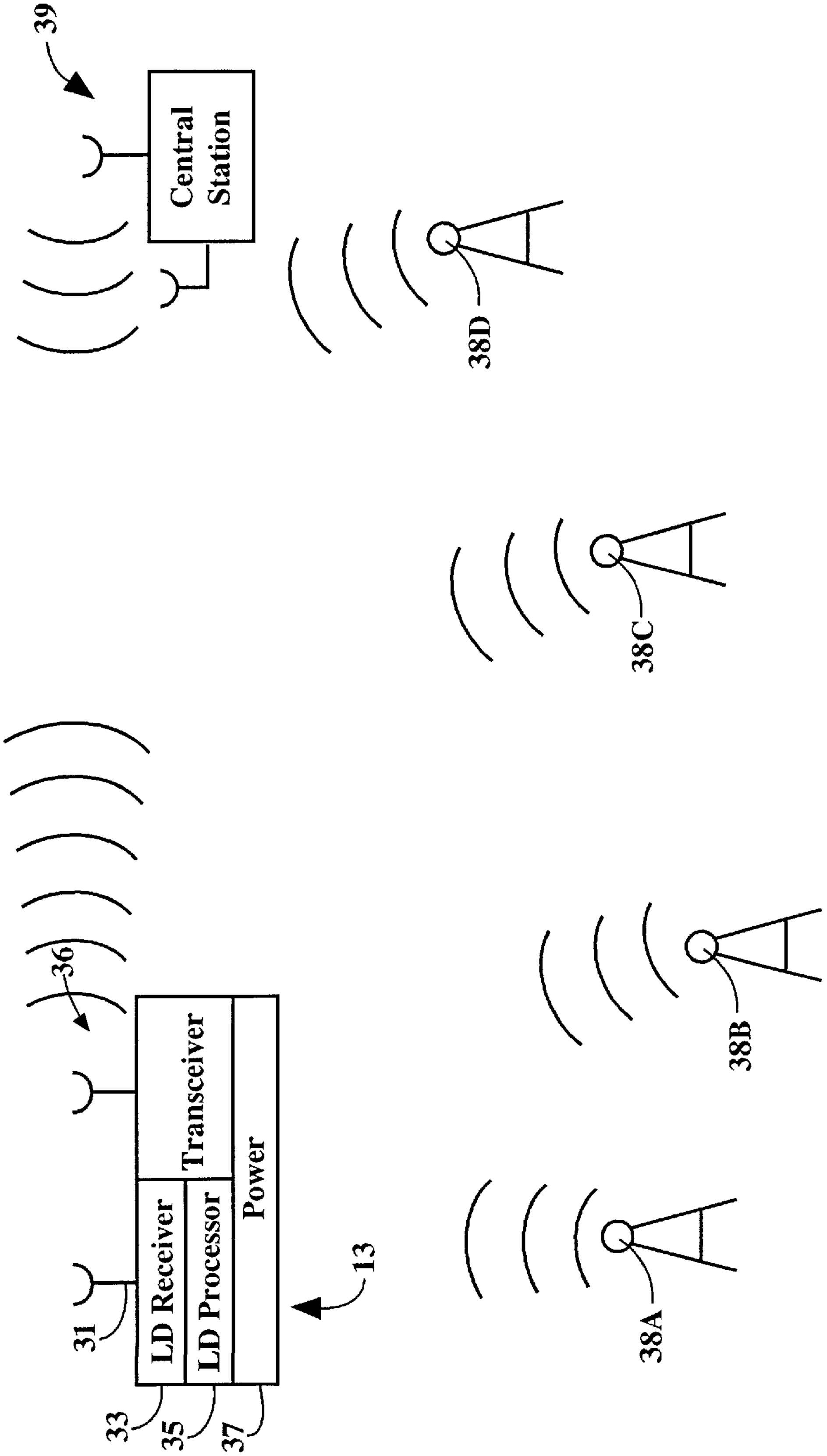
FIG. 3 is a schematic view illustrating use of an LMD unit that transmits and processes FM subcarrier signals, to determine the present location of a designated person according to the invention.

An LMD unit 13, shown in FIG. 3, that is carried by or attached to the MP 11 includes a location determination (LD) antenna 31, an LD signal receiver 33, a motion sensor 34 that issues motion sensing signals when the sensor is motionless (or when the sensor is in motion), an LMD signal receiver/processor 35 that receives and analyzes the LD signals and the motion sensor signals, a signal transceiver 36 connected to the processor, and power supply 37, for receiving certain LD radiowave signals from one or more LD signal source 38A, 38B, 38C and/or 38D. Information from these LD signals and from the motion sensor signals may be transmitted, unprocessed, by the transceiver 36 to a central processing station 39, located at or near the site R, to allow determination of the present location coordinates and/or the present velocity coordinates of the MP 11 periodically (e.g., second-by-second, or more or less often, if desired). In a first mode of operation of the LMD unit 13, all signal processing occurs at the central station, and the LMD signal processor 35 may be deleted. Alternatively, the LD signals received by, and the motion sensing signals generated by, the LMD unit 31 may be partly or fully processed by the LMD signal processor 35 to partly or fully determine the present location and possible motion of the LMD unit. This processed information may be transmitted to the central station 39 for final determination of the present location and/or motion of the MP 11. The motion sensor 34 is optionally detachable from the remainder of the LMD unit 31.

If the MP 11 is outdoors or is within any building or other structure that is not electromagnetically isolated, the LMD signals may have any frequency, and GPS, GLONASS, Loran, Omega, Decca, Tacan, JTIDS Relnav, PLRS, FM subcarrier signals, or other radiowave signals may be used. If the MP 11 is within an electromagnetically isolating structure, FM subcarrier signals may often still be received within the structure without disabling signal attenuation or signal distortion. However, the invention does not require that LD signals be receivable within or near an electromagnetically isolating structure; outdoor LD signals can also be used with the invention.

In the embodiment illustrated in FIG. 1, the invention uses FM subcarrier signals emitted by three or more spaced apart FM signal sources 15, 17 and 19, positioned at known locations in the community, together with an FM signal monitor (and, optionally, source) 21 that is also located at a known position. If the FM signal monitor 21 also serves as a source, this source is preferably separated by a large distance from a plane P(15,17,19) passing through the locations of the other three FM station antennas. In this instance, the source 21 may be located on a very tall tower, for example, relative to the heights of the transmitting antennas of the other FM sources 15, 17 and 19.

The FM signal monitor 21: (1) receives the FM subcarrier signals transmitted by the other FM stations 15, 17 and 19; (2) determines the relative phases of these subcarrier signals at their respective sources, using the known distances of the antennas of each of the other FM stations 15, 17 and 19 from the FM monitor 21; (3) transmits a signal on another selected frequency that advises any FM subcarrier signal receiver of these relative phases; and (4) optionally transmits its own FM subcarrier signal, with a phase determined by an optional selected linear combination of the phases of the other three FM subcarrier signals, or determined independently of the other three phases. The MP 11 wears the portable LMD unit 13 and is assigned an identifying indicium that is included in any transmission by that LMD unit to the central station 39. Optionally, the central station 39 can continually or periodically advise a communications, command and control (C3) center of the location and/or velocity of the MP 11, or of the locations and/or velocities of several such persons.

The LMD unit 13 serves as a mobile station that receives the FM subcarrier signals and optionally transmits phase information for each of these subcarrier signals to the central station 39 for (further) processing and analysis. The central station 39 has a known location relative to each of the FM signal sources 15, 17, 19 and FM signal monitor 21 and can determine the phase of each these FM signals relative to a selected phase reference or can determine the FM signal source phases relative to each other at a selected time. One advantage of use of relatively low frequency FM signals, such as $f_c$±19 kHz, is that such signals are attenuated and/or distorted less, in passing through walls, floors and ceilings of normal buildings, than are higher frequency radiowave signals, such as AM signals. In normal circumstances, the relative phases of the FM signal sources 15, 17, 19 and FM monitor 21 would not change, or would change at most a few times in any 24-hour period. However, the invention provides for the possibility that these relative phases can change often and/or quickly.

At or around a given time t=t0, the FM subcarrier signals broadcast by the FM sources 15, 17, 19 and FM monitor 21 (optional) are $$S'_m(t)=S_0\exp[j(\omega_m t-\phi_m)](m=15,\ 17,\ 19,\ 21)(j^2=-1), \tag{1}$$

where $\omega_m$ and $\phi_m$ are the subcarrier frequency and present phase of the FM signal source number m. The subcarrier frequencies $\omega_m$ are preferably distinct from and spaced apart from one another. Optionally, the signal $S_m(t)$ may itself be modulated with a known signal to produce a signal $S_{m,mod}(t)$ that is different for each source (m) and that allows identification of each source signal, independently of whether the subcarrier frequencies are distinct. The subcarrier signals are received at the LMD device 13 as time-varying signals of the form $$S'_m(t)=S_0\exp[j(\omega_m t-\phi_m-\omega_m d_m/c')](m=15,\ 17,\ 19,\ 21), \tag{2}$$

where c' is the average propagation velocity in the transmission medium (mostly air) and $$d_m=[(x-x_m)^2+(y-y_m)^2+(z-z_m)^2]^{1/2} \tag{3}$$

is the distance from the FM signal source number m to the LMD unit 13, whose present location coordinates (x, y, z) and/or velocity coordinates ($v_x$, $v_y$, $v_z$) are as yet undetermined. analysis. The central station 39 has a known location relative to each of the FM signal sources 15, 17, 19 and FM signal monitor 21 and can determine the phase of each these FM signals relative to a selected phase reference or can determine the FM signal source phases relative to each other at a selected time. One advantage of use of relatively low frequency FM signals, such as $f_c$±19 kHz, is that such signals are attenuated and/or distorted less, in passing through walls, floors and ceilings of normal buildings, than are higher frequency radiowave signals, such as AM signals. In normal circumstances, the relative phases of the FM signal sources 15, 17, 19 and FM monitor 21 would not change, or would change at most a few times in any 24-hour period. However, the invention provides for the possibility that these relative phases can change often and/or quickly.

At or around a given time t=t0, the FM subcarrier signals broadcast by the FM sources 15, 17, 19 and FM monitor 21 (optional) are $$S_m(t)=S_0\exp[j(\omega_m t-\phi_m)](m=15, 17, 19, 21)(j^2=-1), \quad (1)$$

where $\omega_m$ and $\phi_m$ are the subcarrier frequency and present phase of the FM signal source number m. The subcarrier frequencies $\omega_m$ are preferably distinct from and spaced apart from one another. Optionally, the signal $S_m(t)$ may itself be modulated with a known signal to produce a signal $S_{m,mod}(t)$ that is different for each source (m) and that allows identification of each source signal, independently of whether the subcarrier frequencies are distinct. The subcarrier signals are received at the LMD device 13 as time-varying signals of the form $$S'_m(t)=S_0\exp[j(\omega_m t-\phi_m-\omega_m d_m/c')](m=15, 17, 19, 21), \quad (2)$$

where c' is the average propagation velocity in the transmission medium (mostly air) and $$d_m=[(x-x_m)^2+(y-y_m)^2+(z-z_m)^2]^{1/2} \quad (3)$$

is the distance from the FM signal source number m to the LMD unit 13, whose present location coordinates (x, y, z) and/or velocity coordinates ($v_x$, $v_y$, $v_z$) are as yet undetermined.

If the phases $\phi_m$ are known, the distances $d_m$ can be determined from Eq. (2). From any three physically realistic three distances, such as $d_{15}$, $d_{17}$ and $d_{19}$, two candidate location coordinate triples (x,y,z) can be found that, in principle, satisfy Eqs. (3) for measured distances $d_m$ (or phases $\phi_m$). Adding the distance $d_m$ of a fourth FM subcarrier signal source, such as 21, will, in principle, allow elimination of one of these two candidate triples so that only one location coordinate triple (x, y, z) remains for the present location of the LMD unit 13. In practice, this scheme will not work well if the four FM signal sources lie approximately in a plane or in a line and the present location of the LMD device 13 also lies close to or in that plane or that line. Preferably, one of the four FM signal sources, optional FM source 21, should be spaced far apart from the plane passing through the locations of any three other FM signal sources 15, 17 and 19. This separation distance is preferably at least ten percent of the maximum distance from the FM source 21 to the other FM sources 15, 17 and 19. This formalism can be used for FM signals and for AM signals. This formalism can also be used for electromagnetic signals of any frequency emitted by a ground-based distance measuring system, such as Loran, Omega, Decca,. Tacan, JTIDS Relnav or PLRS, or a Satellite Positioning System (SATPS), such as GPS or GLONASS, collectively referred to herein as an "outdoor LMD system."

In one cycle of an FM subcarrier signal of frequency $f_m=f_{c,m}\pm19$ kHz (m=15, 17, 19, and optionally 21), an electromagnetic wave will move a distance equal to one wavelength $\lambda=c'/\omega_m$, or about 15.8 kilometers (km) in a vacuum. Thus, the distance of the LMD device 13 from each FM signal source is known modulo 15.8 km. This distance ambiguity can be removed by initialization techniques. For example, if the designated site R has a diameter that is <<15.8, the present location of the MP 11 can be determined at one location on the site R, with one set of FM signal source phases, and can be used for all locations on or adjacent to the site R by determining phase changes for each signal relative to this initial location. That is, the phase $\phi_m$ is initially determined at a time t=t0 for each FM or other location signal transmitter, using Eq. (2) or another suitable relation to determine the absolute or relative phases of the signals arriving from the signal source m at a known location, the initial location of the MP 11 on the site R.

Assume that FM signal source number m (m=15, 17, 19, and optionally 21 ) has known coordinates ($x_m$, $y_m$, $z_m$). From the determinable phase differences of the signals arriving from each FM source at a selected location with as-yet-undetermined coordinates (x,y,z) (such as the present location of the MP 11), source number m is determined to lie at a distance $d_m$ from the selected location. FM subcarrier signals, emitted from FM sources 15, 17, 19 and 21 (optional) with synchronized phases, would arrive at the selected location with time differences $\Delta t_{ij}$ or source-to-source phase difference $\Delta\phi_{ij}$ (i≠j; i, j=15, 17, 19, 21) that are determined by $$\Delta\phi_{ij}=2\pi(d_i-d_j)f/c'=f\Delta t_{ij}/c', \quad (4)$$

$$d_i=[(x-x_i)^2+(y-y_i)^2+(z-z_i)^2]^{1/2}, \quad (5)$$

where c' is the velocity of light propagation in the ambient medium and f is the frequency of the FM subcarrier signals. The three phase differences $\Delta\phi_{ij}$ (i≠j; i,j=15, 17, 19) define three intersecting hyperboloids or similar quadratic surfaces, each having two sheets. In general, the common intersections of each of these three groups of sheets should define a point or segment of a curve, where the two points (or curve segments) I1 and I2 shown in FIG. 3 are mirror images of each other with respect to the plane P(15,17,19) defined by the coordinates ($x_i$,$y_i$,$z_i$) of the ith transmitter of the FM subcarrier signals. A fourth FM subcarrier signal source 21 (optional), because it is displaced from and does not lie on the plane P(15,17,19), transmits FM subcarrier signals that have two distinct phase differences at the intersection points I1 and I2. This fourth FM subcarrier signal can thus distinguish between I1 and I2 and allow determination of the correct location coordinates (x,y,z) for the selected location. This assumes that the phases of the four FM subcarrier signals are synchronized, with zero phase differences or known phase differences between any two of these signals. In practice, each of the four FM subcarrier signal sources will have a phase that may drift with time or change abruptly at particular times.

Where the four FM subcarrier signals have different phases, these source phase differences $\Delta\Phi_{ij}$ must be determined and removed before Eq. (4) can be used to determine the location coordinates (x,y,z) of the selected location. The phase differences $\Delta\Phi_{ij}$ can be determined by providing an FM subcarrier signal monitor station 21 that receives the other three FM subcarrier signals (i=1, 2, 3 in this example) and determines the phase differences $\Delta\Phi_{i,21}$. The FM monitor 21 uses its knowledge of the separation distances between itself and the (other) FM subcarrier signal sources and of the measured signal phase differences at the monitor from the other three FM subcarrier signals. As noted above, the phase differences $\Delta\Phi_{i,21}$ may vary with time, through drift, abrupt change, or both. The FM signal monitor station then broadcasts the phase differences $\Delta\Phi_{i,21}$, preferably with a different carrier frequency than any FM subcarrier frequency, and these phase differences are received and stored and/or processed by a receiver at the LMD unit 13. This LMD unit 13 also receives the FM subcarrier signals and determines the "raw" or uncompensated phase differences $\Delta\phi_{ij}$ at its location (i, j=15, 17, 19). A signal processor associated with this receiver then forms the "true" or compensated phase differences $$\Delta\phi_{15,21}=2\pi(d_{15}-d_{21})/c'\Delta t-\Delta\Phi_{15,21}, \quad (6)$$

$$\Delta\phi_{17,21}=2\pi(d_{17}-d_{21})/c'\Delta t\Delta\Phi_{17,21}, \quad (7)$$

$$\Delta\phi_{19,21}=2\pi(d_{19}-d_{21})/c'\Delta t-\Delta\Phi_{19,21}. \quad (8)$$

This compensates for non-synchronization and possible drifting of the FM subcarrier signals transmitted by the four FM subcarrier signal sources. However, compensation is provided with respect to one of the four FM subcarrier signals, whose own phase may change with time.

Use of an FM signal monitor, which does not otherwise participate in determination of the selected location coordinates (x, y, z), to determine the phase differences $\Delta\phi_{ij}$ (ij=15,17,19), is disclosed in U.S. Pat. No. 5,173,710 issued to Kelley et al, which is incorporated herein by reference. The FM source phase differences $\Delta\Phi_{ij}$ can be measured using a digital phase-locked-loop at the additional FM receiver/transmitter, as disclosed in FIGS. 4–11 and the accompanying text in the Kelley et al patent. In the subject invention, the FM signal monitor 21 used for monitoring the source-to-source phase differences optionally provides a fourth FM subcarrier signal (j=21), and the phase differences of the other three FM subcarrier signals are determined relative to the phase of the FM subcarrier signal transmitted by the FM signal monitor 21.

The FM signal monitor 21 can also serve as a reference station with accurately known location for differential position computations for determining the present location of the outdoor LMD signal antenna. Differential position techniques use the known location of the reference station to remove some of the errors contained in signals received by a mobile station, such as the MP 11, that is located within a few tens of kilometers from the reference station. GPS and differential GPS techniques are discussed in Tom Logsdon, *The NAVSTAR Global Positioning System,* Van Nostrand Reinhold, 1992, pp. 1–90, and differential Loran and differential Decca techniques are discussed in U.S. Pat. No. 5,045,861, issued to Duffet-Smith. The information from these references is incorporated by reference herein. Thus, the FM signal monitor station 21 can include an outdoor LMD signal antenna and associated outdoor LMD signal receiver/processor, to receive the outdoor LMD signals and to determine any location error values contained in these signals by comparison of the calculated location with the known location of the reference station. The FM signal monitor 21 can also include a transmitter to transmit these error values to a receiver/processor at the outdoor LMD signal unit so that the calculated present location of the outdoor LMD signal antenna can be adjusted by removal of outdoor LMD signal errors that have been determined from the signals received at the FM signal monitor station 21 (which also serves as an outdoor LMD signal reference station). Compensation for outdoor LMD signal errors can be provided at the reference station 21 or at the outdoor LMD unit.

Figure 4:
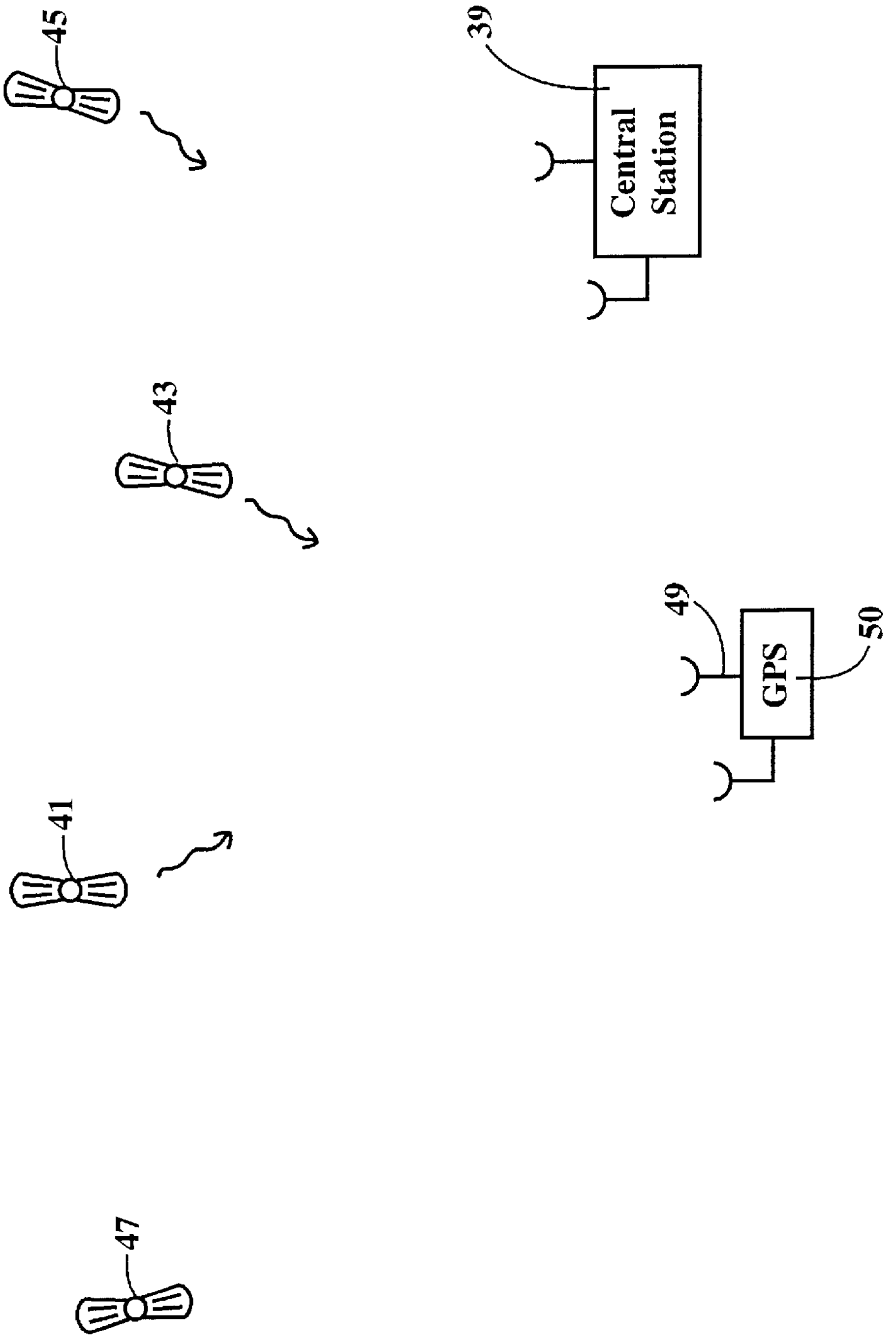
FIGS. 4 and 5 are schematic views illustrating use of outdoor location determination systems, using satellite-based signals and using ground-based signals, respectively, to determine the present location and/or present velocity of an LMD unit according to the invention.

The FM signals indicated in FIGS. 1 or 3 may be used outside as well as inside a building or other structure to allow determination of the present location of the MP 11. Alternatively, FM signals may be used for inside-the-building location reporting and may be supplemented for outside-the-building location reporting by supplemental (outdoor) LMD signal sources. One suitable outdoor LMD signal source, illustrated in FIG. 4, is a Global Positioning System (GPS) or Global Navigation Orbiting System (GLONASS) or similar satellite-based location determination system (collectively referred to as GPS herein). A GPS includes a plurality of three or more visible, Earth-orbiting, non-geosynchronous satellites 41, 43, 45, 47 that each transmit a continuous, distinguishable electromagnetic signal that is received by a GPS antenna 49 and associated GPS signal receiver/processor 50 on or near the Earth's surface. The GPS receiver/processor 50 determines the present location of the GPS antenna by suitable processing of three or more GPS signals received from the GPS satellites 41, 43, 45, 47. A GPS and a GLONASS are discussed in more detail below. Global Positioning System signals are available throughout the world, whereas FM signal reception is often limited to line-of-sight reception, with a representative maximum reception distance of about 50 kilometers. A Global Positioning System is discussed in detail in Tom Logsdon, op cit.

Because the GPS signals use a high frequency carrier (above 1 GHz), these signals may be severely attenuated and/or distorted if such signals are received inside a building or other structure that is partly or fully electromagnetically isolating. For this reason, GPS or GLONASS signals would ordinarily be unsuitable for determination of the present location of an LD antenna that is positioned within such a building or similar structure. The invention avoids this difficulty by using signals issued by a motion sensor and signals issued by another signal generator when the MP is within or near an electromagnetically isolating structure.

The combined use of FM signals for location determination inside a building or similar structure (e.g., a deep shaft mine or tunnel under or through the Earth) plus GPS signals for location determination outside a building or similar structure can also provide a satisfactory LMD system in most urban and non-urban communities.

Figure 5:
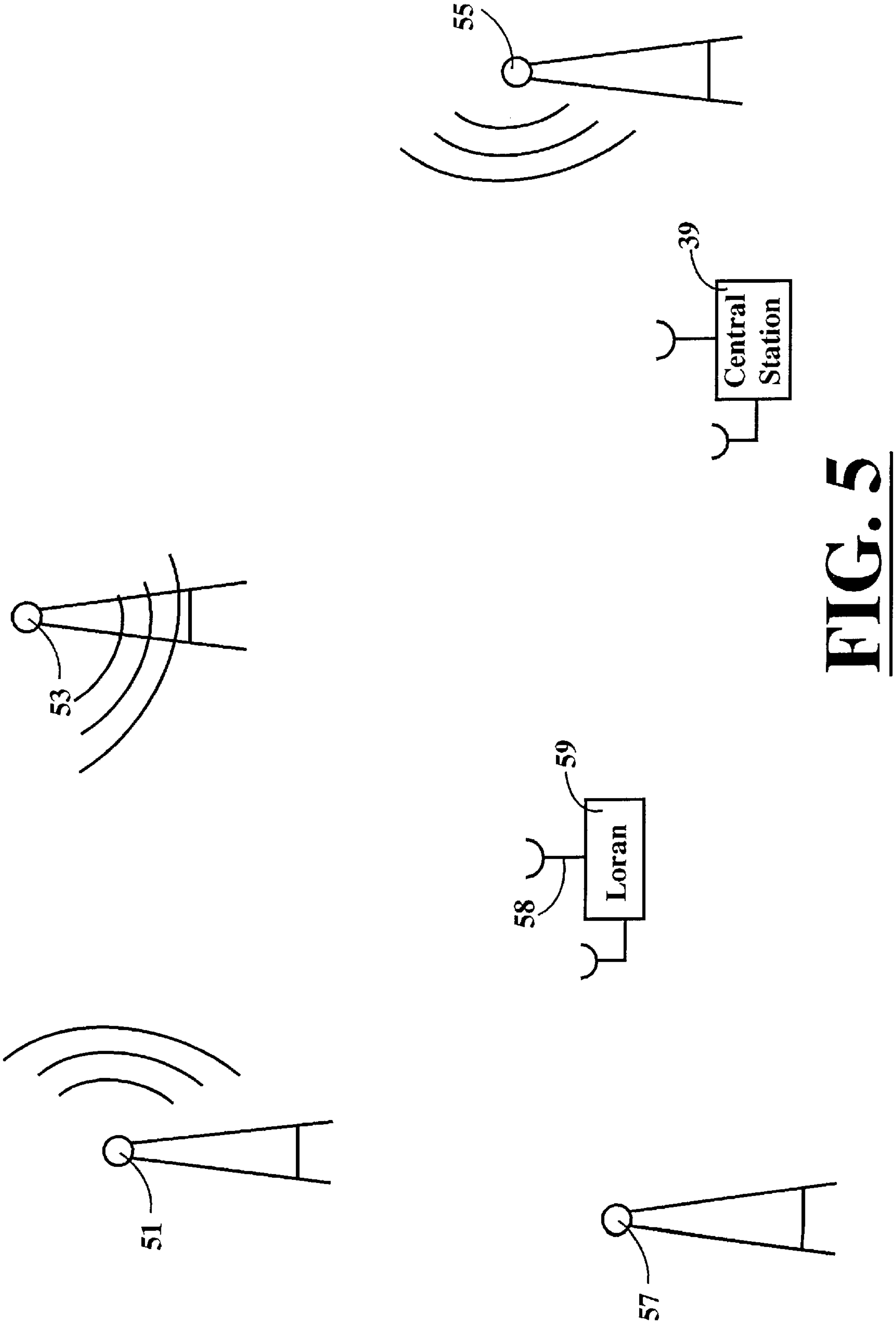

Alternatively, the GPS signals may be replaced by Loran-C signals produced by three or more Loran signal sources positioned at fixed, known locations, for outside-the-building location determination, as illustrated in FIG. 5. A Loran-C system relies upon a plurality of ground-based signal towers 51, 53, 55 and 57, preferably spaced apart 100–300 km, that transmit distinguishable electromagnetic signals that are received and processed by a Loran signal antenna 58 and Loran signal receiver/processor 59. A representative Loran-C system is discussed in *Loran-C User Handbook,* Department of Transportation, U.S. Coast Guard, Commandant Publication P16562.5, November 1992, which is incorporated by reference herein.

Loran-C signals use carrier frequencies of the order of 100 kHz and have maximum reception distances of the order of hundreds of kilometers. Loran-C signals (alone) can be used as the LD signals in the invention. The combined use of FM signals for location determination inside a building or similar structure plus Loran-C signals for location determination outside a building or similar structure can also provide a satisfactory LMD system in most urban and suburban communities.

Other ground-based radiowave signal systems that are suitable for use as part of an LMD system include Omega, Decca, Tacan, JTIDS Relnav (U.S. Air Force Joint Tactical Information Distribution System), PLRS (U.S. Army Position Locaton and Reporting System) and ORBCOM. Most of these systems are summarized in Logsdon, op. cit., pp. 6–7 and 35–40.

Other radiowave signals, such as emergency band signals in the frequency ranges 12.23–13.2 MHz, with suitable signal timing and a signal indicium included therein, can be used as a source of LMD signals for outdoors locations. For convenient reference, a satellite-based or ground-based location determination system, not including a system that uses FM subcarrier signals, that can be used to determine the location of an MP 11 over relatively long distances outside a building or other structure over the region R will sometimes be referred to as an "outdoor LMD system".

Figure 6:
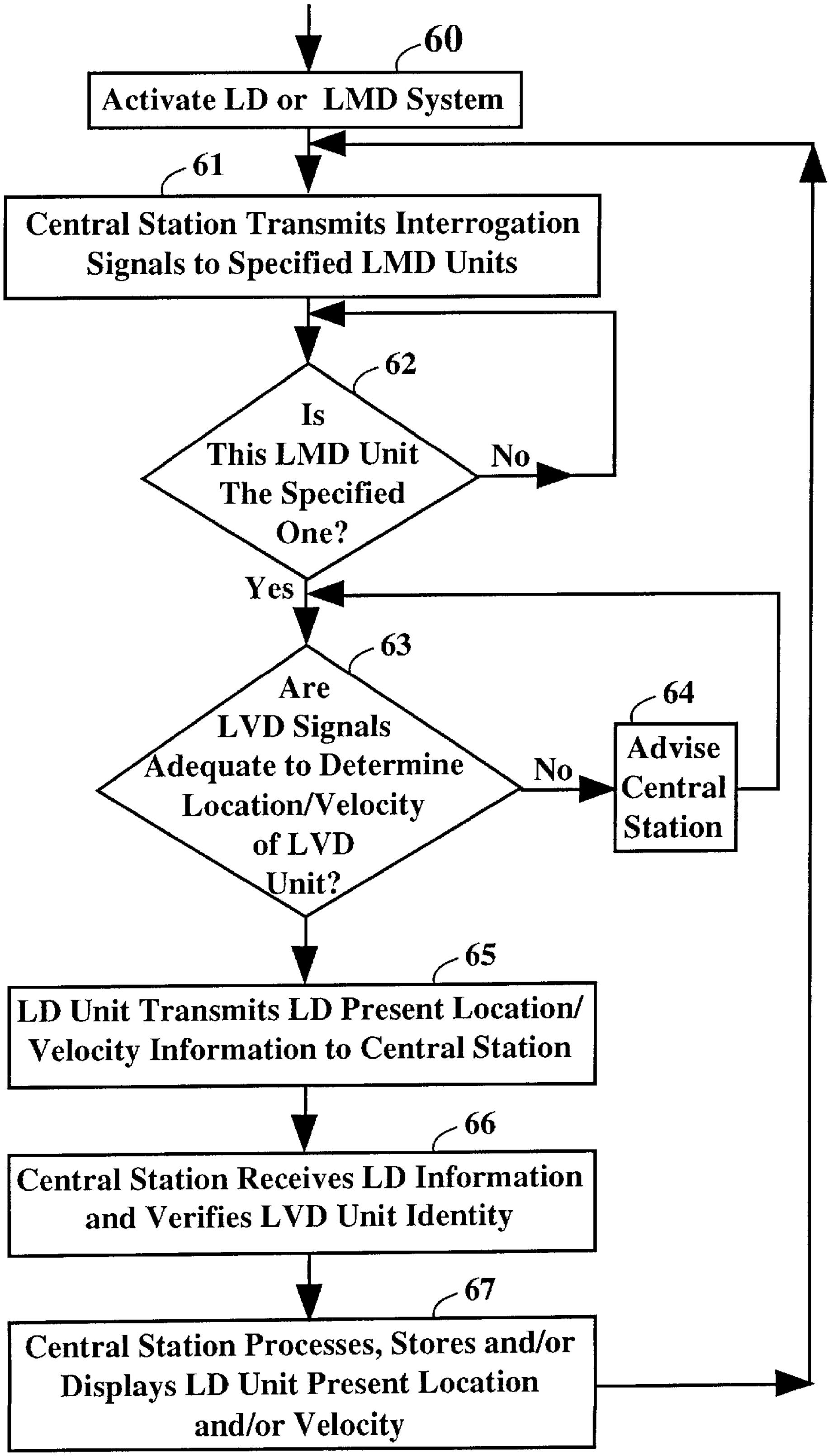
FIG. 6 is a flow chart illustrating a suitable procedure, according to the invention, for determining the present location of an LMD unit, using only FM subcarrier signals.

FIG. 6 is a flow chart of a procedure that can be used to determine the present location of the MP 11, if an FM subcarrier system is used for all location determinations inside and outside buildings and other structures in a region R. In step 60, the LMD system is activated and made ready to determine the present location and/or present motion of an MP 11. A central station or other interrogator transmits an interrogation signal (e.g., "Where are you?") in step 61, with an identifying label, tag or indicium attached that specifies the identified MP 11, or specifies the LMD unit 13 carried by that person. In step 62, each LMD unit determines if it is the LMD unit specified by the central station's interrogation signal. If a given LMD unit is not the specified unit, that LMD unit ignores this interrogation signal and recycles until receipt of the next interrogation signal. If the LMD unit carried by the identified MP 11 is the specified unit, this unit optionally determines if the FM subcarrier signals received are adequate to determine the present location of the LMD unit, in step 63. If the FM subcarrier signals are inadequate, the LMD unit optionally advises the central station of this circumstance, in step 64.

Assuming that the FM subcarrier signals are adequate to determine the present location of the LMD unit or that steps 63 and 64 are absent in the flow chart of FIG. 6, the LMD unit responds, in step 65, by transmitting to the central station the last location fix computed by that LMD unit and any other relevant and available information on the identified arrestee's condition or circumstance. Preferably, the specified LMD unit responds by transmitting the requested information to the central station in a time slot (of length 10–200 msec) allocated for this response. Preferably, the responding LMD unit also includes a label, tag or other indicium identifying the responding LMD unit. The central station receives the response signal from the LMD unit and verifies that this signal carries the correct LMD unit indicium, in step 66. In step 67, the LMD unit processes, stores and/or visually or audibly displays information on the specified LMD unit present location and/or present velocity.

The procedure shown in FIG. 6 would be followed irrespective of whether the LMD unit 13 is presently inside or outside a building or other structure, because only one LMD system is providing the LMD information. Alternatively, the LMD unit can partly process the LD and motion sensor signals and can transmit this partly processed information to the central station 39 for further signal processing and determination of the LMD unit's present location. As a second alternative, the LMD unit can automatically retransmit, unprocessed, suitable information (timing, relative phases, etc.) that the LMD unit is receiving from each of the FM subcarrier signal sources and allow the central station to do all LMD signal processing.

Figure 7:
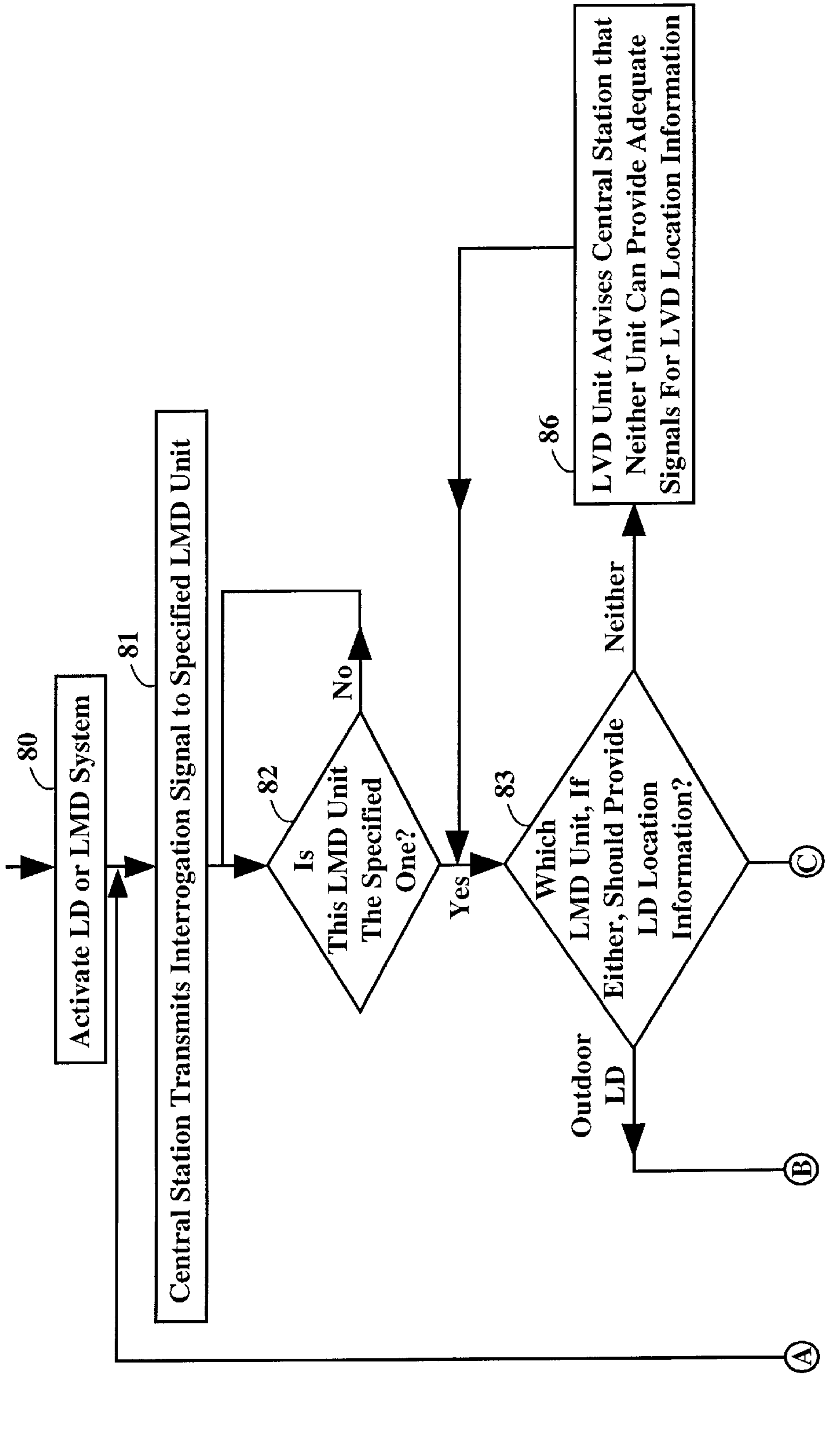
FIG. 7 is a flow chart illustrating a suitable procedure, according to the invention, for determining the present location of an LMD unit, using a combination of FM subcarrier signals and signals generated by an outdoor LMD system.
Figure 7:
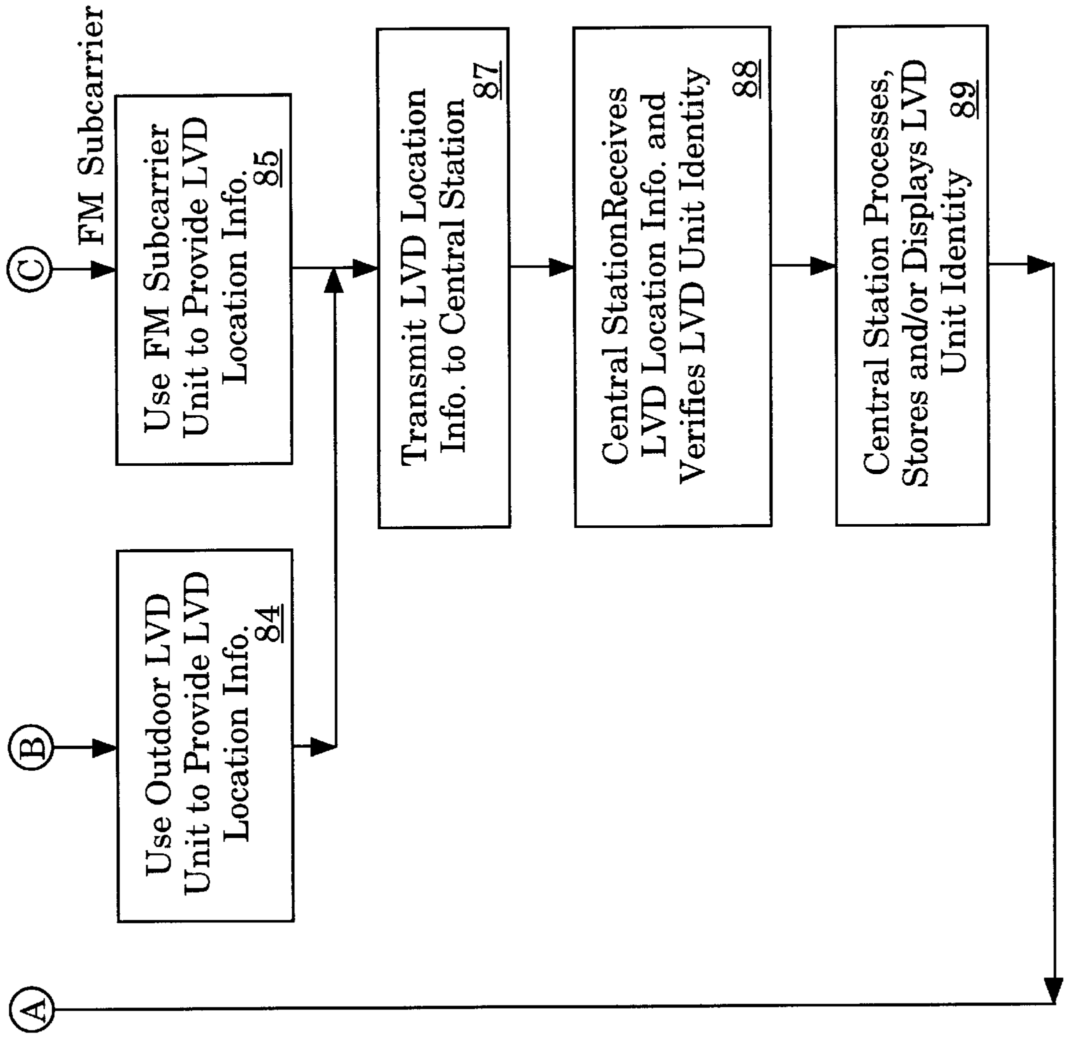

FIG. 7 is a flow chart of a procedure that can be used to determine the present location of each MP 11, where a combination of FM subcarrier signals and signals provided by an outdoor LMD system are used for location determination. The LMD system is activated in step 80. The central station interrogates a specified LMD unit by transmitting an interrogation signal with a label, tag or other indicium that identifies that LMD unit, in step 81. Each LMD unit receives this interrogation signal and determines if the interrogation signal is directed to that LMD unit, in step 82. If a given LMD unit is not the one specified by the interrogation signal, that LMD unit ignores the interrogation signal and recycles until the LMD unit receives another interrogation signal.

If a given LMD unit is specified in the interrogation signal, that LMD unit automatically determines, in step 83 of FIG. 7, whether the LMD information should be provided by the outdoor LMD unit, by the FM subcarrier unit, or by neither, based upon the present location of that LMD unit and/or an indicium for each FM subcarrier signal and for each outdoor LMD signal that indicates which of the two signals is likely to provide the most accurate location under the circumstances. The indicium for each signal preferably is a measure of the signal robustness, such as signal strength, or the signal quality, such as signal-to-noise ratio. Use of such indicia is discussed in the co-pending patent applications entitled "Hybrid Location Determination System," U.S. application Ser. No. 08/171,557, and Portable Hybrid Location Determination System," U.S. application Ser. No. 08/191,984, assigned to the assignee of this application. In some circumstances, neither the FM subcarrier signals nor the outdoor LMD signals may provide acceptable signals for location determination, and the LMD unit optionally advises the central station of occurrence of this circumstance, in step 87.

If the LMD unit is located outside of and away from all buildings and structures, the LMD unit can use the outdoor LMD unit to provide LMD information on its present location and/or present velocity, as in step 84, or can use the FM subcarrier unit for this purpose. If the LMD unit is located inside a building or other structure or in another location that is inaccessible to outdoor LMD system signals, the FM subcarrier unit provides present location and/or present velocity information for the LMD unit, in step 85. If neither the FM subcarrier signals nor the outdoor LMD signals are adequate for location determination, the LMD system advises the central station of this, in step 86. In step 87, the LMD unit transmits to the central station its LMD information, unprocessed, partly processed or fully processed, to the central station, preferably including a first label, tag or other indicium that identifies the responding LMD unit and a second label, tag or other indicium indicating which, if any, of the two LMD systems has provided the LMD information. Optionally, the LMD unit can transmit the requested information to the central station in an allocated time slot (of length 10–200 msec) for this response. In step 88, the central station receives the information transmitted by the LMD unit, verifies the identity of the responding LMD unit, and determines which signal processing route to use, based in part on which LMD system has provided the LMD information. The central station processes, stores and/or visually or audibly displays the present location of the specified LMD unit, in step 89.

Figure 8:
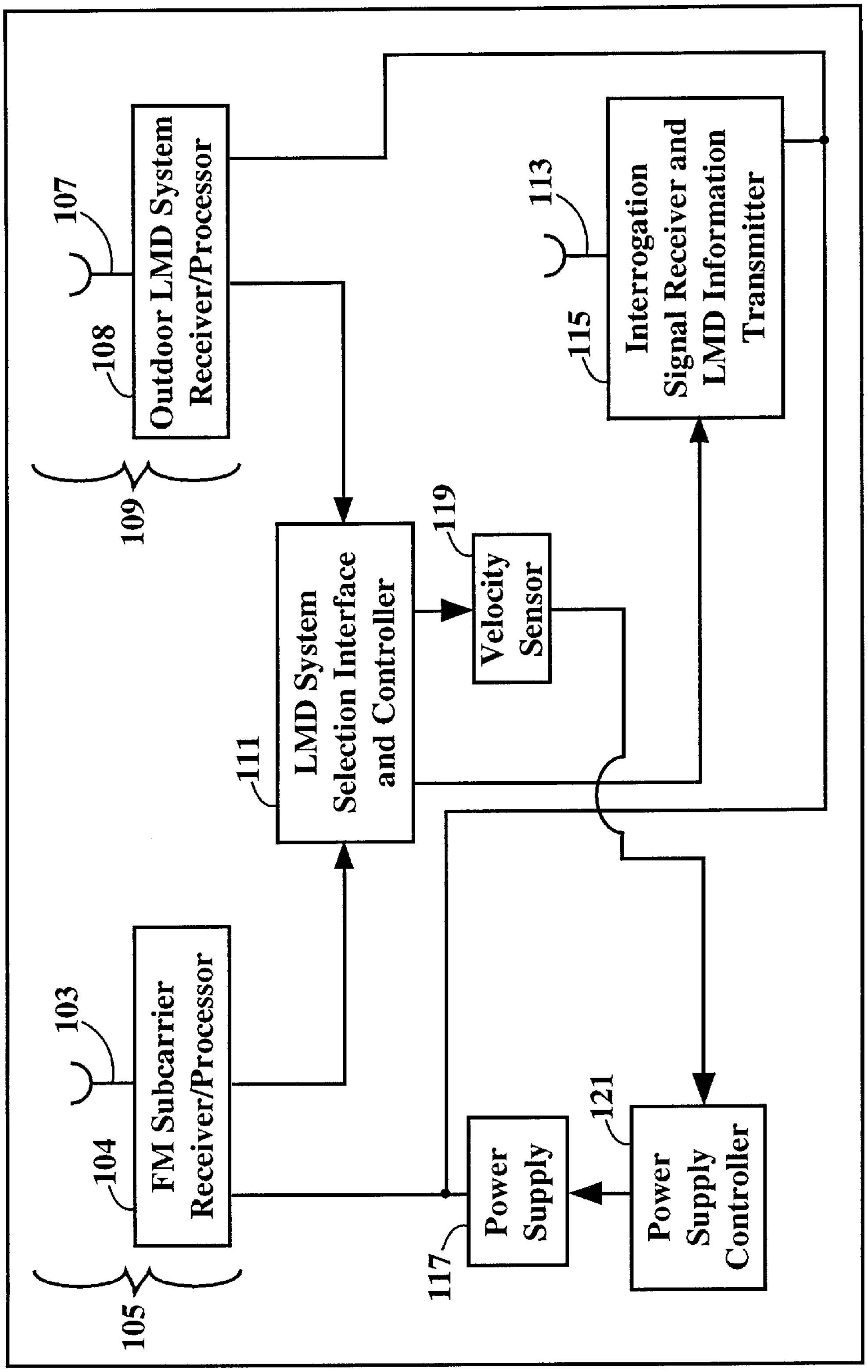
FIG. 8 is a schematic view of a location determination unit that receives and processes FM subcarrier signals and signals from an outdoor LMD system.

FIG. 8 is a schematic view of a portable location determination unit 101 that may be used to practice the invention, where a combination of FM subcarrier signal system and an outdoor LMD system are used to determine location of an LMD unit in the region R. The LMD unit 101 includes an FM subcarrier LMD module 105, including an FM signal antenna 103 and receiver/processor 104, and an outdoor LMD module 109, including an outdoor LMD signal antenna 107 and receiver/processor 109. Each of the receiver/processors 104 and 108 is connected to an LMD unit interface and LMD unit controller 111. The controller 111 receives location signals or other indicator signals from each of the receiver/processors 104 and 108 and determines whether the FM subcarrier signal system or the outdoor LMD system, if any, will be selected to respond to receipt of an interrogation signal requesting location and/or velocity information from the LMD unit 101 or to determine the present location and/or present velocity of the LMD unit.

This selection can be based upon the present location and/or present velocity of the LMD unit 101, or upon one or more signal conditions associated with the signals received and/or processed by each of the receiver/processors 104 and 108. The output signal (the selected location and/or velocity information signal) of the controller 111 is received by an LMD signal transmitter and antenna 1 13 and 115 and is transmitted to the central station that issued the interrogation signal. The LMD signal antenna and transmitter 113 and 115 can also serve as the antenna and receiver, respectively, that receive the interrogation signal transmitted by the central station. A power supply 117 supplies electrical power for at least one of the other components in the LMD unit 101. If the LMD unit 101 is not required to process any of the LMD signals received by either of the antennas 103 and 107, the two receiver/processors 104 and 108 can be deleted or simplified in the LMD unit. If only the FM subcarrier signals, or only the outdoor LMD signals, are used to determine the location of the LMD unit 101, the unused LMD antenna (103 or 107) and LMD receiver/processor (104 or 108) and part or all of the controller 111 can be deleted in the LMD unit 101.

The location coordinates (x, y, z) of the LMD unit 101 carried by the MP 11 in FIG. 1 are now known. The location coordinates (x, y, z) of the LMD unit 101 are compared with the range of location coordinates of the region R and its boundary 6R, or with the range of location coordinates for any other region and its boundary in which the MP 11 is presently permitted to be. If the location coordinates (x, y, z) of the LMD unit 101 are within the site R bounded by the boundary δR, the receiver/processor 104 or 108 need take no action. If the location coordinates (x,y,z) lie elsewhere, the receiver/processor 104 or 108 transmits a silent radiowave alarm to the central station, indicating that the MP 11 has moved beyond the permitted region or site R and indicating the present location coordinates of the MP 11. The MP's movement within and outside the arrestee site R can thus be tracked by the central station.

Alternatively, the present location information for the MP 11 can be transmitted, unprocessed or partly processed or fully processed, to the central station. The central station then completes any signal processing needed and determines whether the MP location coordinates (x,y,z) lie within the permitted site R or beyond the boundary δR. If these location coordinates lie beyond the permitted site boundary, or if the central station does not receive K consecutive LMD response signals from the LM unit 13 worn by the MP 11 (K a selected positive integer), the central station can transmit an alarm or otherwise alert the proper authorities to apprehend the MP.

Figure 9:
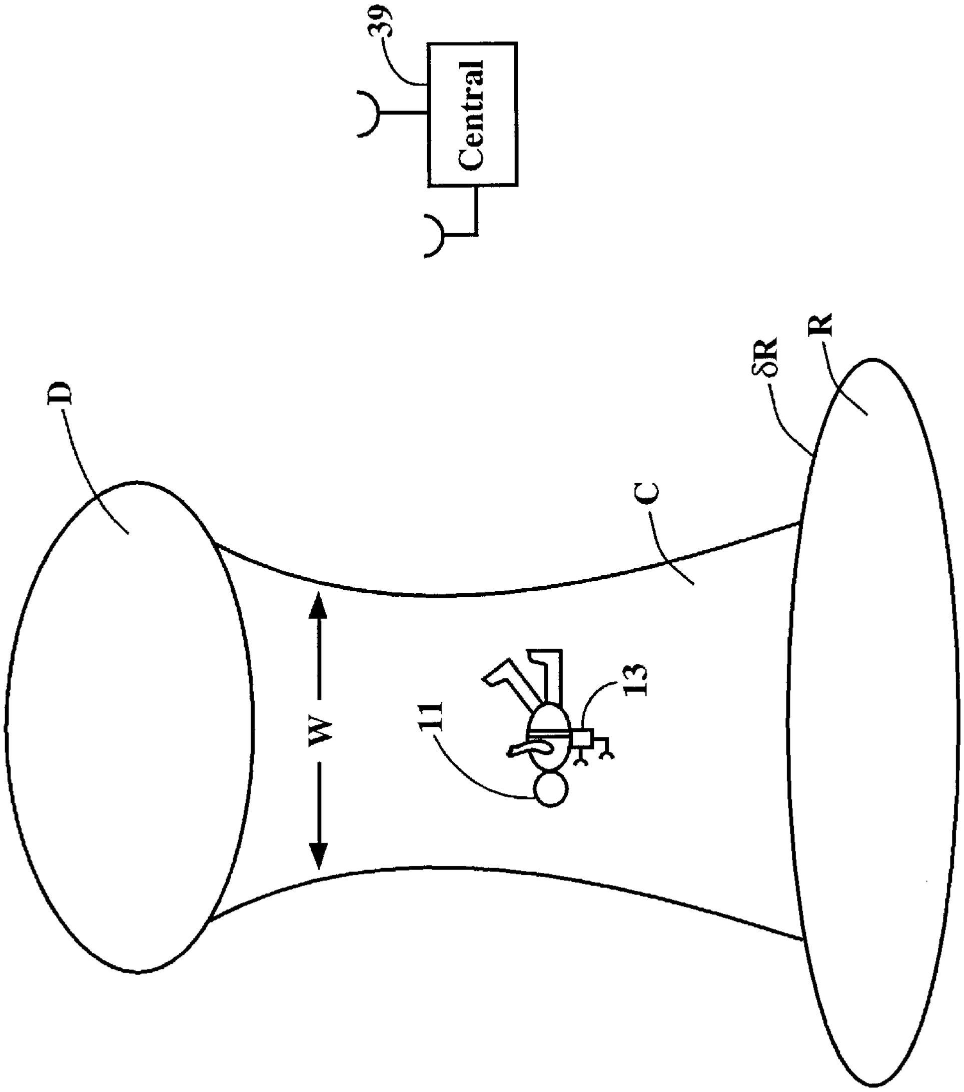
FIG. 9 is a schematic view illustrating use of the invention to provide a corridor C from the site MP's usual confinement site R to a permitted destination D that is spaced apart from the site R.

From time to time, the MP 11 may need to leave the site R for legitimate personal needs, such as a visit to his/her physician or dentist, a visit to a hospital for emergency or elective medical treatment, or to purchase food or other necessary personal items. In such instance, the site R can be expanded, temporarily, by prearrangement with the central station 39 to include a corridor C connecting the region R to the physician's office or other legitimate destination D for the MP, as indicated in FIG. 9. When the MP 11 returns to the original site R after the prearranged visit, the corridor C and destination D are deleted and the permitted site again becomes the original site R. Alternatively,. the MP 11 can be moved from the first permitted site R to a destination site D, and the first-permitted site R and the corridor C can be deleted after the MP arrives at the new permitted site D. The width W of the corridor C may be as little as 30–40 feet, which is the width of an average residential street. Alternatively, the width W may be much greater to allow for use of any of two or more alternative paths connecting the original site R to the destination D within the corridor C. The width W may vary along the corridor C. The movements of the MP 11 in the corridor C may be timed, and the MP may be required to move according to a selected time schedule, with time tolerances optionally included to compensate for reasonable but unexpected time delays in movement between the permitted site R and the destination site D.

Figure 10:
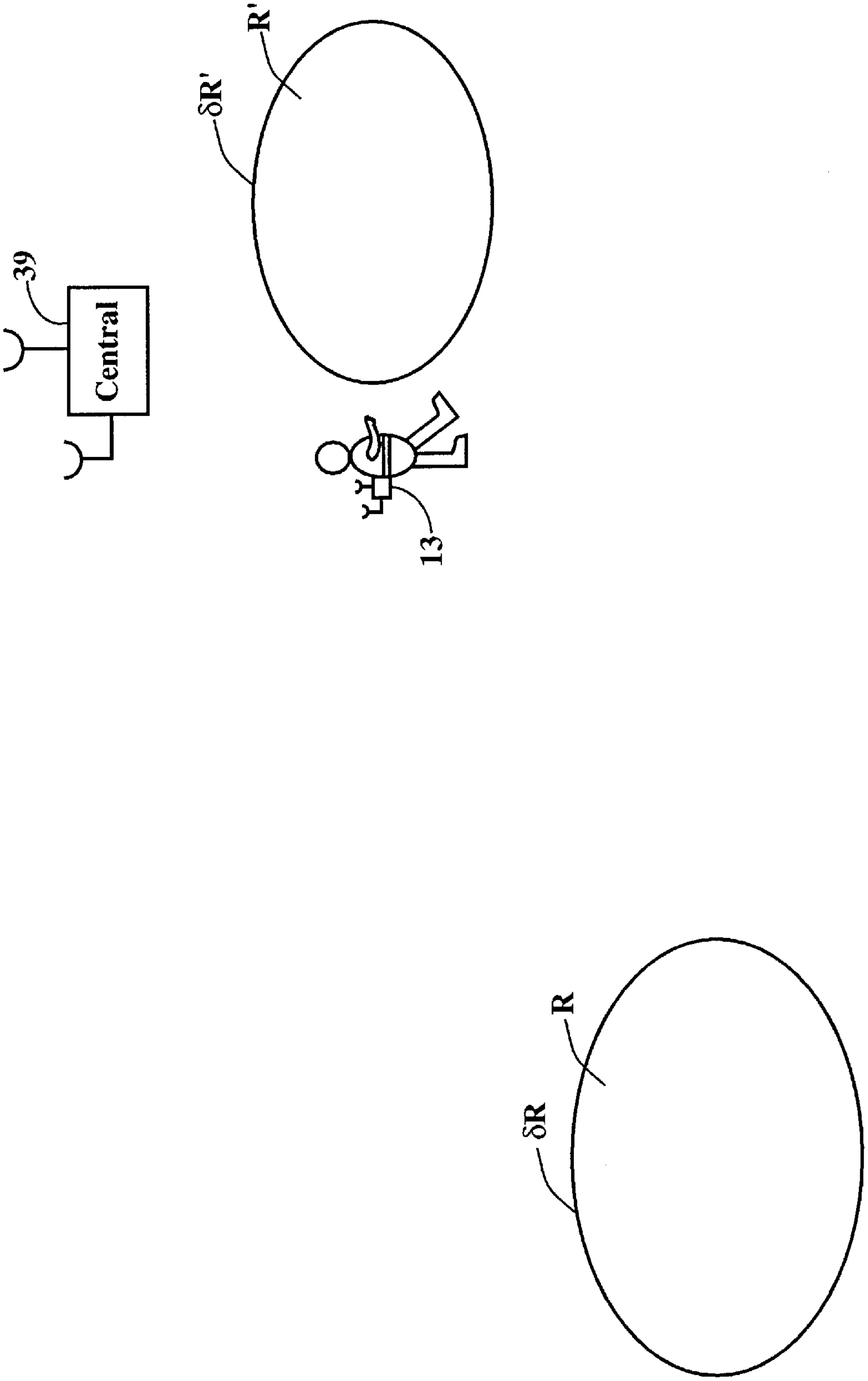
FIG. 10 is a schematic view illustrating use of the invention to provide one or more exclusion regions R* where the MP is not permitted to go under any circumstances.

The MP 11 may be under court order or other constraint to avoid certain exclusion regions R*, such as the homes and/or offices of persons also involved in crimes or other activities or the residences and work places of persons whom the MP might harass or injure. This could also include the home and/or office of an estranged spouse, victim or witness to commission of a crime in which the MP 11 was involved. In this instance, the permitted region R would be supplemented at the central station 39 by an exclusion region R*, surrounding and including each home, office and/or other facility that the MP must avoid at all times, as illustrated in FIG. 10. If the MP 11 leaves the site R and crosses a designated boundary δR* of the exclusion region R*, the receiver/processor 104 or 108 in the LMD unit 101 (FIG. 8) attached to the MP notifies the central station 39 of this development by another silent radiowave alarm, and police can be dispatched to intercept the arrestee. Optionally, the receiver/processor 104 or 108 in the LMD unit 101 could cause the MP to become disabled, for example by rendering the MP unconscious, using trans-dermal application across the MP's skin of a strong sedative or depressant. Trans-dermal application devices are available from Alza Corp., Palo Alto, Calif., and from other manufacturers in this field.

Figure 11:
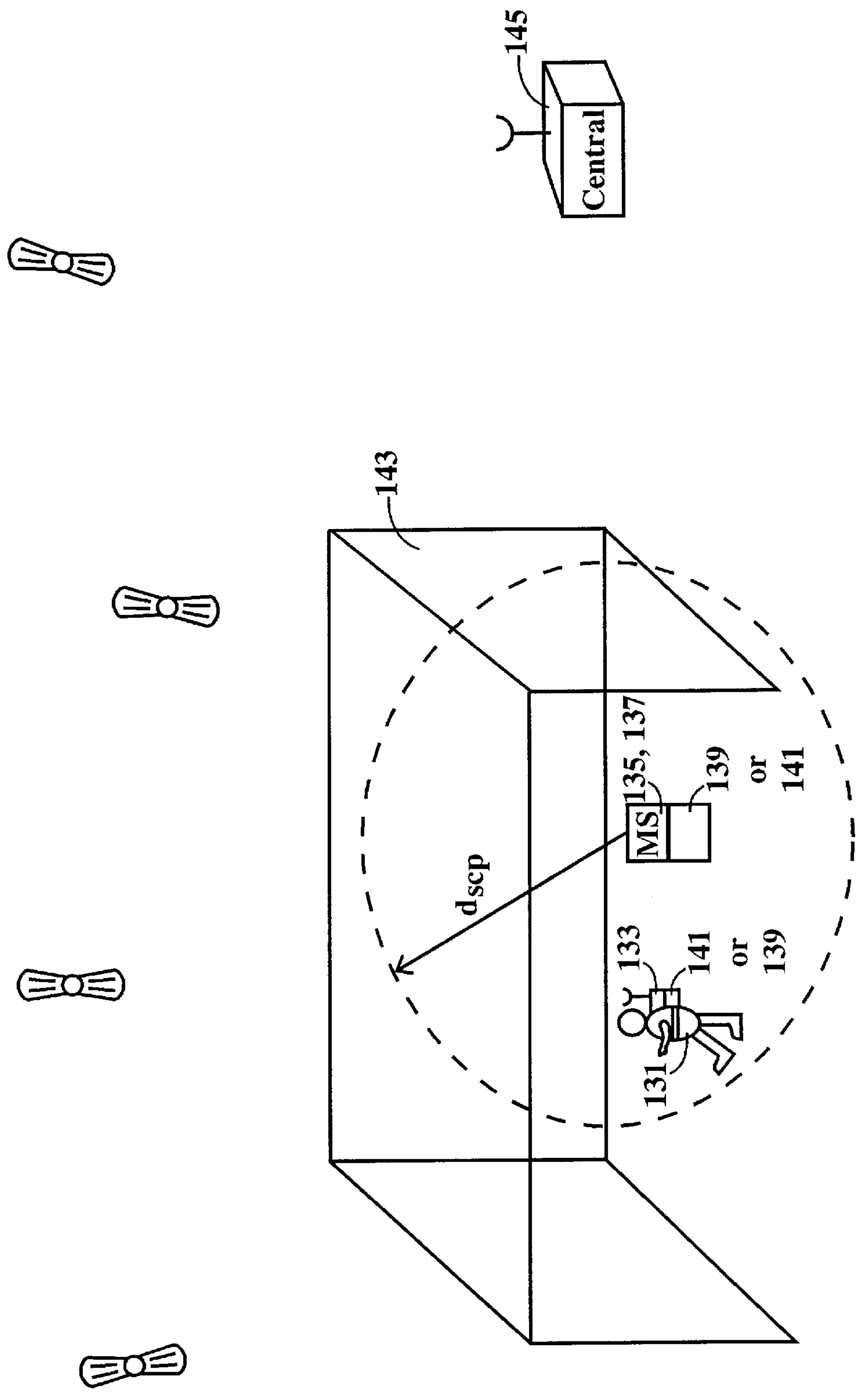
FIG. 11 is a schematic view illustrating use of the invention within a structure that interferes with receipt of LMD signals.

FIG. 11 illustrates a low-power-consumption embodiment of the invention, in which an MP 131 carries an LMD unit 133, which includes an FM subcarrier signal module or an outdoor LD module 134, in combination a timer 135, an optionally detachable motion sensor 137, an optionally detachable localization signal generator 139 and an optionally detachable signal attribute sensor 141. When the MP 131 moves to within a building or other structure 143, the MP has a time interval of selected length $\Delta t_{mot}$ to move to some location within the structure and to settle down or position the motion sensor, using elapsed time as measured by the timer 135. The timer need not be very accurate. The time interval length $\Delta t_{mot}$ may be chosen in the range 5–120 sec, preferably in the range 30–60 sec. When the MP 131 "settles down," the MP positions the motion sensor 137 adjacent to the location where the MP has settled down, and this motion sensor quickly determines that it is not moving. After this motion sensor senses absence of motion within the time interval of length $\Delta t_{mot}$, the motion sensor 137 causes the LMD unit 133 to notify a central station 145 that the MP's motion has (temporarily) ceased. The LMD unit (except the motion sensor 137) then optionally enters a sleep mode, in which many but not all of its operations are temporarily curtailed and the power consumption is correspondingly reduced. At this time, the local signal generator 139 begins to continuously transmit a distinguishable localization signal having a selected frequency or combination of frequencies $f_{loc}$, and the signal sensor 141 begins to receive this localization signal and to measure a localization signal attribute A. The localization signal attribute value A is an approximate measure of the distance between the localization signal generator 139 and the signal sensor 141. The frequency or frequencies $f_{loc}$ are chosen to be low enough that the localization signal suffers only modest attenuation in passing through or around the walls and other obstructions within the structure 143.

The localization signal attribute A varies approximately inversely with the distance from the localization signal generator 139 to the signal sensor 141. Either the localization signal generator 139 or the signal sensor 141, but not both, is carried by the MP; the other of these two devices remains at a selected (preferably fixed) central location within or near the structure 143. When the signal sensor 141 senses that the localization signal intensity I, as received by this sensor 141, has dropped below a selected threshold $A_{thr}$ (or has increased above this threshold), corresponding to a selected approximate distance of separation $d_{sep}$ between the localization signal generator 139 and the signal sensor 141, the MP receives a second advisory signal and has a time interval of a selected length $\Delta t_{ret}$ to move to a location (preferably outside or away from the structure 143) where the MP's location can again be determined by the LMD unit 131. This embodiment allows the MP 131 to move around within the structure 143 after settling down, within an approximate sphere of radius approximately $d_{sep}$ centered at the present location of the motion sensor 137, without requiring the MP to "check in" with the monitoring authorities or to re-locate himself or herself using the LMD unit 133. If the MP fails to properly respond to the second advisory signal within the time interval of length $\Delta t_{ret}$, the LMD unit 133 advises the central station 145 of this breach, and the central station responds accordingly.

Figure 12A:
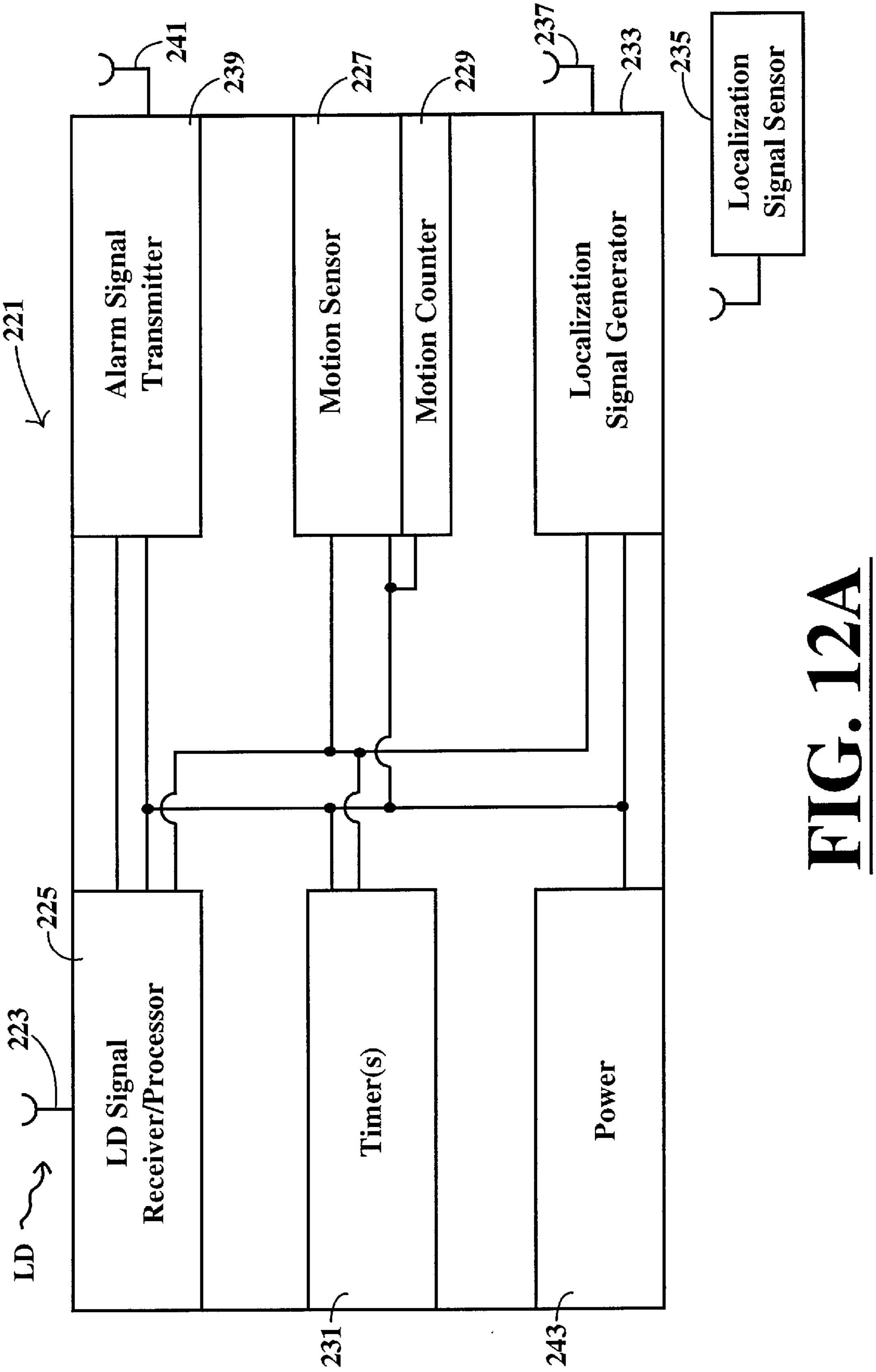
FIG. 12 is a flow chart showing a suitable procedure for practicing an embodiment of the invention illustrated in FIG. 11.
Figure 12B:
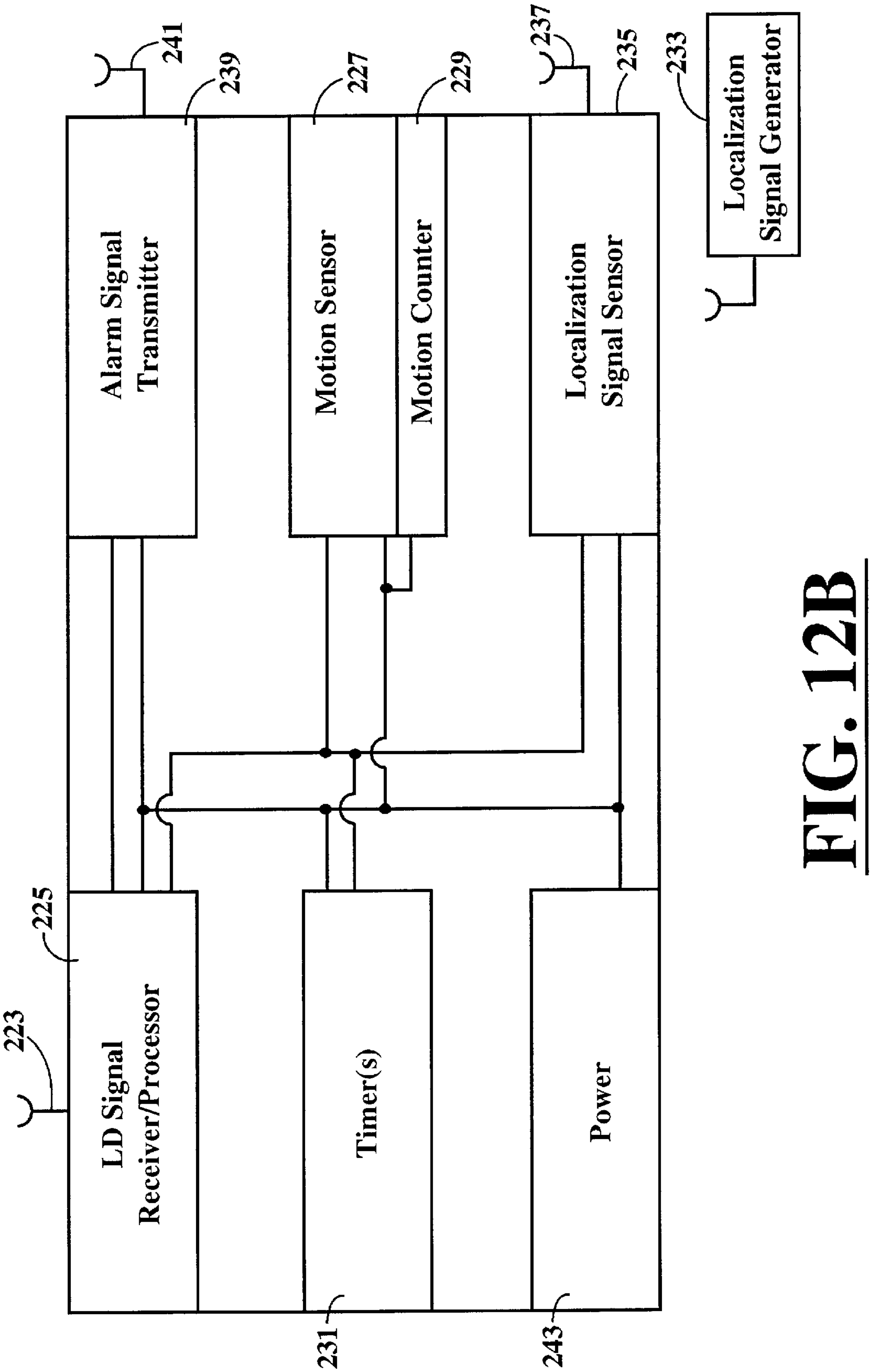

The localization signal sensor 139 and signal sensor 141 (only one is present here) and the timer 135 are shown, together with other LMD unit apparatus components that are necessary for practice of this embodiment, in FIG. 12. Most other components shown in FIG. 12 perform as in FIG. 8. The controller 111 may be used to coordinate the procedures carried out by the timer 135, motion/velocity sensor 137, localization signal generator 139 and signal sensor 141.

In the embodiment illustrated in FIG. 11, no LD signals, such as FM subcarrier signals, that can be received inside an electromagnetically isolating structure need be transmitted, received or analyzed. Use of LD signals is discussed in the patent application entitled "Flexible Site Arrestee Monitoring," U.S. application Ser. No. 08/171,228, for which this application forms a continuation in part. Alternatively, an LMD unit that receives and analyzes LMD signals may be used in the embodiment shown in FIG. 11.

The LMD (or LD) signals in this situation may consist solely of outdoor LMD signals transmitted by satellite-based signal sources, such as GPS, GLONASS, GOES, Iridium and Orbcom, or by ground-based signal sources, such as Loran, Omega, Decca, Tacan, JTIDS Relnav and the Personal Location Reporting System (PLRS), or may consist solely of FM subcarrier signals. Location and motion by the MP is accurately monitored outside any building or structure 143 that might interfere with receipt of outdoor LD signals. Within a building or structure 143 that would interfere with receipt of outdoor LD signals, the MP has a motion sensor 137 that senses motion but that is not required to determine the MP's location. The MP is assigned an approximate sphere of radius $d_{sep}$ within the structure 143, within which the MP can move without accounting for the MP's movements or activities. The LMD unit 133 (except the motion sensor 137) optionally enters a sleep mode, with substantially reduced electrical power. requirements, while the MP moves within this sphere. When the MP moves beyond this sphere, or outside or beyond the building or structure 143, the MP must take specified actions, within a selected time interval, such as 10–30 sec: (1) the MP must "check in" or re-activate or re-initiate the LMD unit 131 and facilitate continued monitoring of the MP's location and/or motion; and/or (2) the MP must move to a location such that the localization signal attribute A, as sensed by the signal attribute sensor 141, is again at least equal to the threshold attribute value $A_{thr}$.

If the outdoor LD or LMD signals can be recognizably received within the structure 143 and analyzed, these outdoor LMD signals are optionally used to monitor the present location and/or motion of the MP within that structure or outside that structure.

FIG. 12 is a flow chart showing a suitable procedure for practice of the invention illustrated in FIG. 11. In step 151, the MP obtains one or more location fixes from an outdoor LD or LMD unit, from a location that is outside, or at least not shielded by, a building or other structure. In step 153, the LD unit determines whether its own location is outside the permitted site. If the answer in step 153 is "yes," the LD unit causes an alarm signal number 1 to be transmitted, in step 155, and proceeds to step 157. If the answer in step 153 is "no," the LD unit proceeds to step 157, where the LD unit determines whether it has lost LD signals. The LD unit can lose LD signals because the LD unit is inside or shielded by an electromagnetically isolating structure, such as a building, a large sign, a large tree or group of trees, or other similar obstacles to receipt of LD signals. If the answer in step 157 is "no," the system returns to step 151.

The LMD unit includes a (preferably detachable) motion sensor that senses whether or not the LMD unit is substantially motionless. When the motion sensor senses that the LMD unit is substantially motionless for at least a selected initial time interval $\Delta t_{mot}$ (usually a few tens or hundreds of milliseconds), the motion sensor begins issuing a stationarity signal, which signal continues only as long as the motion sensor remains substantially motionless.

If the answer in step 157 is "yes," the system sets a motion counter value (m) for the motion sensor equal to an initial value, such as in =1,m in step 159. In step 161, the LD unit is activated (upon loss of receipt of the LD signals in step 157), a first time counter is activated and begins to accumulate a first time $\Delta t_1$, and the LD unit issues a first advisory signal, indicating that the MP has a selected (fixed) maximum accumulated time $\Delta t_{1,max}$ (preferably=5–30 sec) in which to set down the motion sensor so that the motion sensor begins to issue its stationarity signal. In step 163, the LD unit determines if it has acquired (or reacquired) the LD signals so that the LD unit can again provide location fixes for itself. It the answer in step 163 is "yes," the system returns to step 151.

If the answer in step 163 is "no," the system determines whether the motion sensor has begun to issue the stationarity signal, in step 165. If the answer in step 165 is "no," the system determines whether the first countdown time interval has expired, equivalent to $\Delta t_1 \geqq \Delta t_{1,max}$, in step 167. If the answer in step 167 is "no," the system returns to step 163. If the answer in step 167 is "yes," the system transmits an alarm signal number 2, in step 169, and returns to step 161.

If the answer in step 165 is "yes," the system proceeds to step 171, where the LD unit is deactivated, the first counter is reset to $\Delta t_1=0$ and deactivated, and a localization signal generator is activated and begins to transmit a distinguishable signal. This distinguishable signal may be a very low frequency signal (<10 kHz) so that this signal can readily pass through building walls and most similar structures. This distinguishable signal is received by a localization signal sensor, and a signal attribute having a signal attribute value A is determined by the sensor from the received distinguishable signal. The signal attribute value A may be measured signal intensity or some other value that is an approximate measure of the distance between the signal generator and the signal sensor. The signal generator or the signal sensor, but not both, is attached to the MP's body. Whichever of the signal generator and the signal sensor that is not attached to the MP's body is located at a selected location, preferably close to or within the structure that has caused loss of the LD signals in step 157. Thus, one of the signal generator and the signal sensor is mobile and moves with the MP within or near the structure. The LD sensor compares the signal attribute value A with a selected threshold value $A_{thr}$. IF $A \geqq A_{thr}$ (or, alternatively, $A \leqq A_{thr}$), an approximate distance d between the signal generator and the signal sensor (approximately) satisfies the relation $d \leqq d_{thr}$, where $d_{thr}$ (>0) is a selected threshold distance, preferably in the range 20–200 feet. If $A < A_{thr}$ (or, alternatively, $A > A_{thr}$), the approximate distance d between the signal generator and the signal sensor (approximately) satisfies the relation $d > d_{thr}$. If $d \leqq d_{thr}$, the signal generator and the signal sensor are said to be "within range" of each other.

In step 173, the system determine if the signal generator and the signal sensor are within range of each other. If the answer in step 173 is "no," the system determines, in step 175, whether a second time counter has begun to count through a second countdown interval from $\Delta t_2=0$ to a selected maximum accumulated second time $\Delta t_2=\Delta t_{2,max}$. If the answer in step 175 is "no," the second time counter is activated and the system issues a second advisory signal, in step 177, and the system proceeds to step 179. If the answer in step 175 is "yes," the system proceeds to step 179.

If the answer in step 173 is "yes," the system proceeds to step 179 and inquires whether the motion sensor is (still) issuing a stationarity signal. If the answer in step 179 is "yes," the system determines whether the second countdown time has expired, in step 181; that is, whether $\Delta t_2 > \Delta t_{2,max}$? If the answer in step 179 and 181 are "yes" and "no," respectively, the system returns to step 173. If the answer in step 179 is "yes" and the answer in step 181 is "yes," the system transmits alarm signal number 3 and returns to 173.

If the answer in step 179 is "no," the system proceeds to step 191, where the second counter is reset to $\Delta t_2=0$ and deactivated and the motion counter is incremented by replacing the motion counter value m by m+1. In step 193, the system determines whether $m >_{max}$. If $m \leqq m_{max}$, the system returns to step 161.

If $m > m_{max}$, the system determines whether a new monitoring time period has begun, in step 195. A monitoring time period has a selectable value, such as 24 hours, at the end of which the various counters (m, $\Delta t_1$, $\Delta t_2$) are reset to initial values. If the answer in step 195 is "yes," the system resets the motion counter value to its initial value, in step 197, and proceeds to step 199. If the answer in step 195 is "no," the system proceeds to step 199.

Incrementing of the motion counter m in step 191, plus steps 159, 193, 195 and 197, can be optionally deleted from the procedures shown in FIG. 12. In this embodiment, if the motion sensor is determined to be non-stationary in step 179, the system resets and deactivates the second time counter in step 191 and proceeds to step 199. Here, no motion counter is used.

In step 199, the LD unit is activated and a third time counter begins to count through a third countdown interval from $\Delta t_3=0$ to a selected maximum accumulated second time $\Delta t_3=\Delta t_{3,max}$. In step 201, the system determines whether the LD unit has acquired (or reacquired) the LD signals. If the answer in step 201 is "yes," the third time counter is reset to $\Delta t_3=0$ and deactivated, in step 203, and the system returns to step 151. If the answer in step 201 is "no," the system proceeds to step 205 and inquires whether the third countdown time has expired ($\Delta t_3 > \Delta t_{3,max}$)? If the answer in step 205 is "no," the system returns to step 201. If the answer in step 205 is "yes," the third counter is reset to $\Delta t_3 0$ and is deactivated and an alarm signal 4 is transmitted, in step 207, and the system returns to step 161.

As noted above, the LMD unit includes either the localization signal generator or the signal intensity sensor, but not both. The other of these two devices is positioned in some central location within or near the structure that interferes with receipt of the LD signals. Preferably, whichever of these two devices is not part of the LD unit is positioned at a permanent and immovable location within or near the structure. In step 171, the LD unit optionally enters a sleep mode (LMD unit deactivated) with reduced power consumption, if the motion sensor remains stationary.

In another embodiment, any or all of the steps involving (1) the first time counter and alarm signal number 2, (2) the second time counter and the alarm signal number 3, and/or (3) the third time counter and the alarm signal number 4 can be deleted in the flow chart in FIG. 12.

Figure 13:
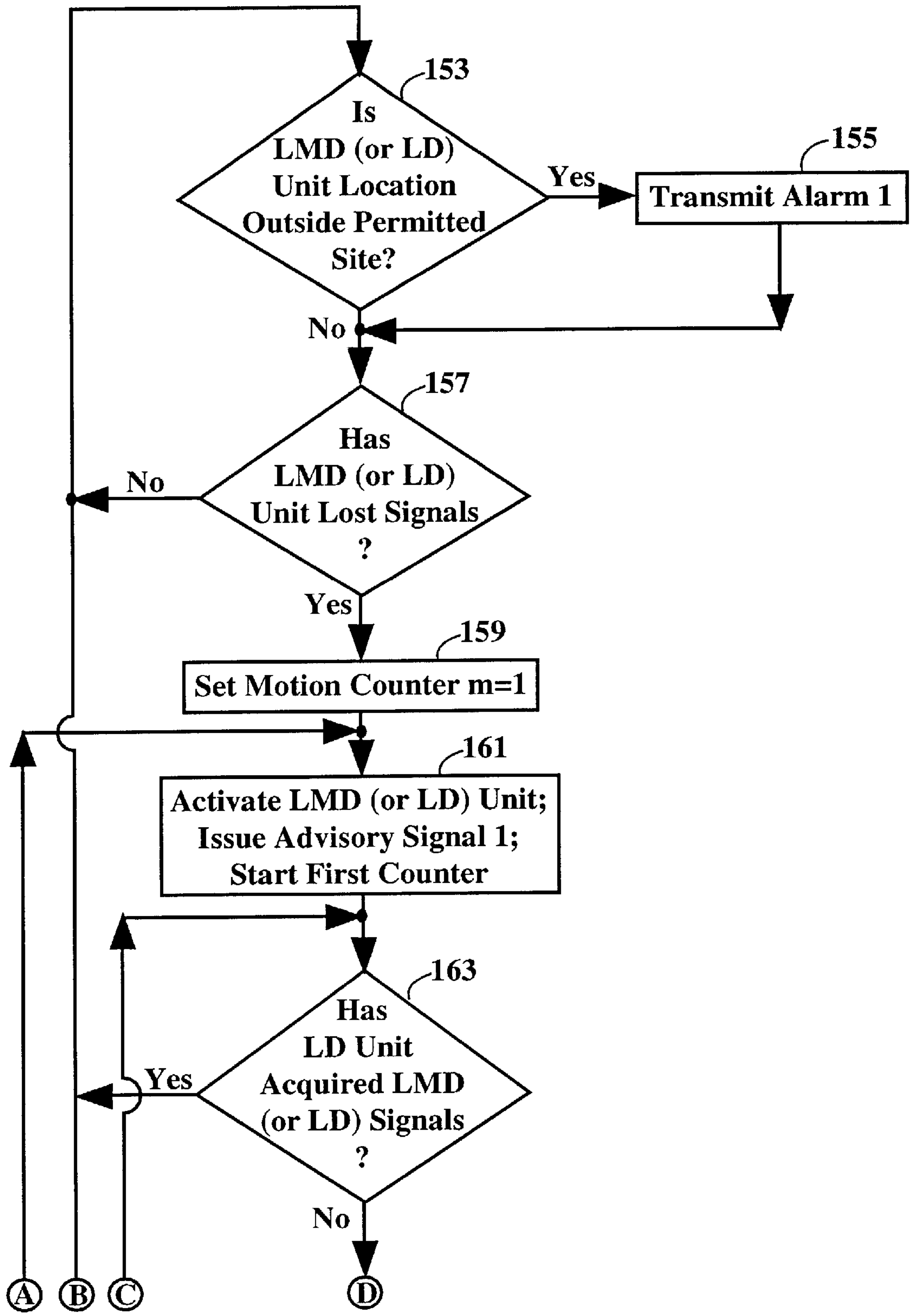
FIGS. 13A and 13B are schematic views of an LMD unit that monitors the approximate location of an MP inside or outside a structure.
Figure 13:
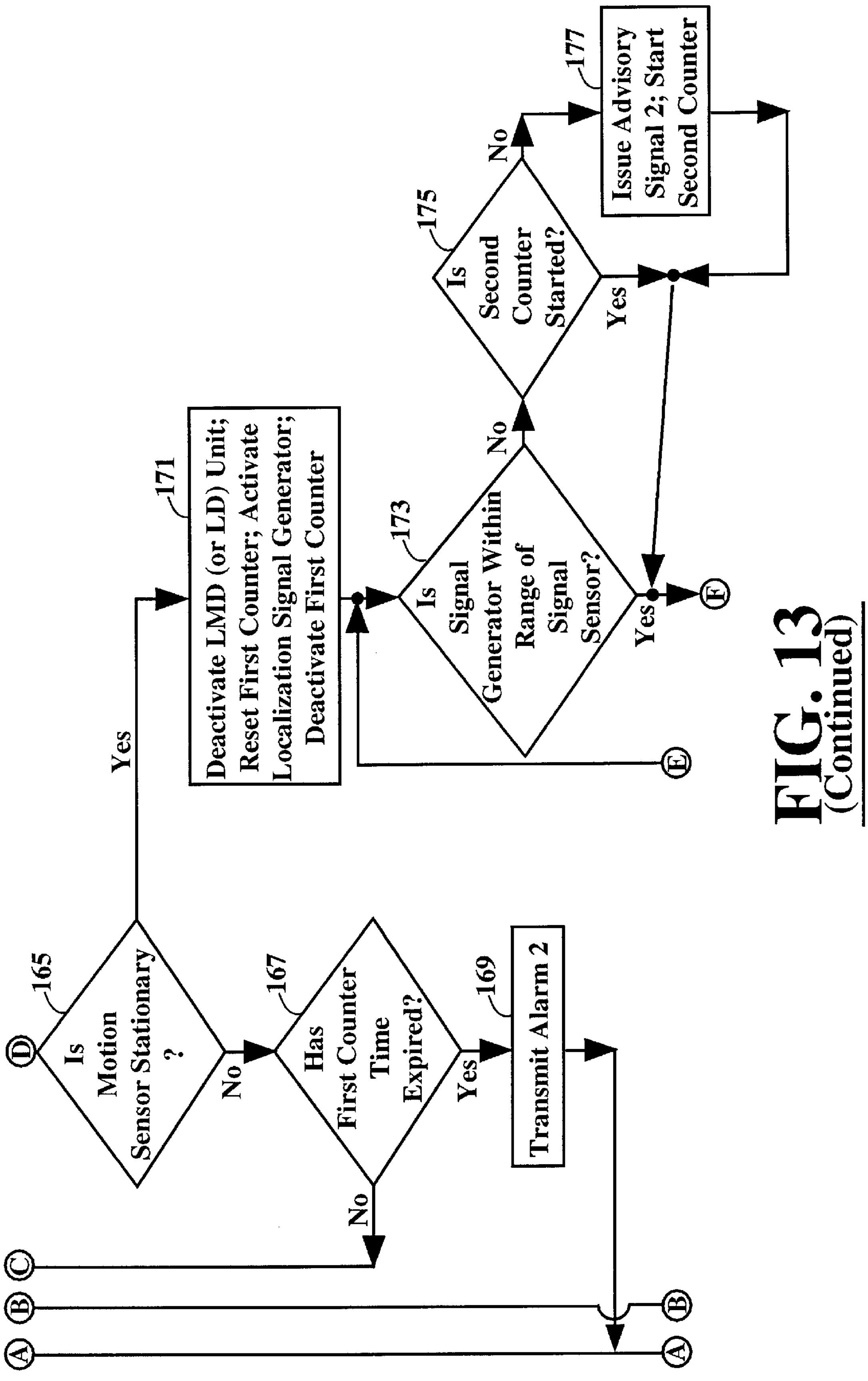
Figure 13:
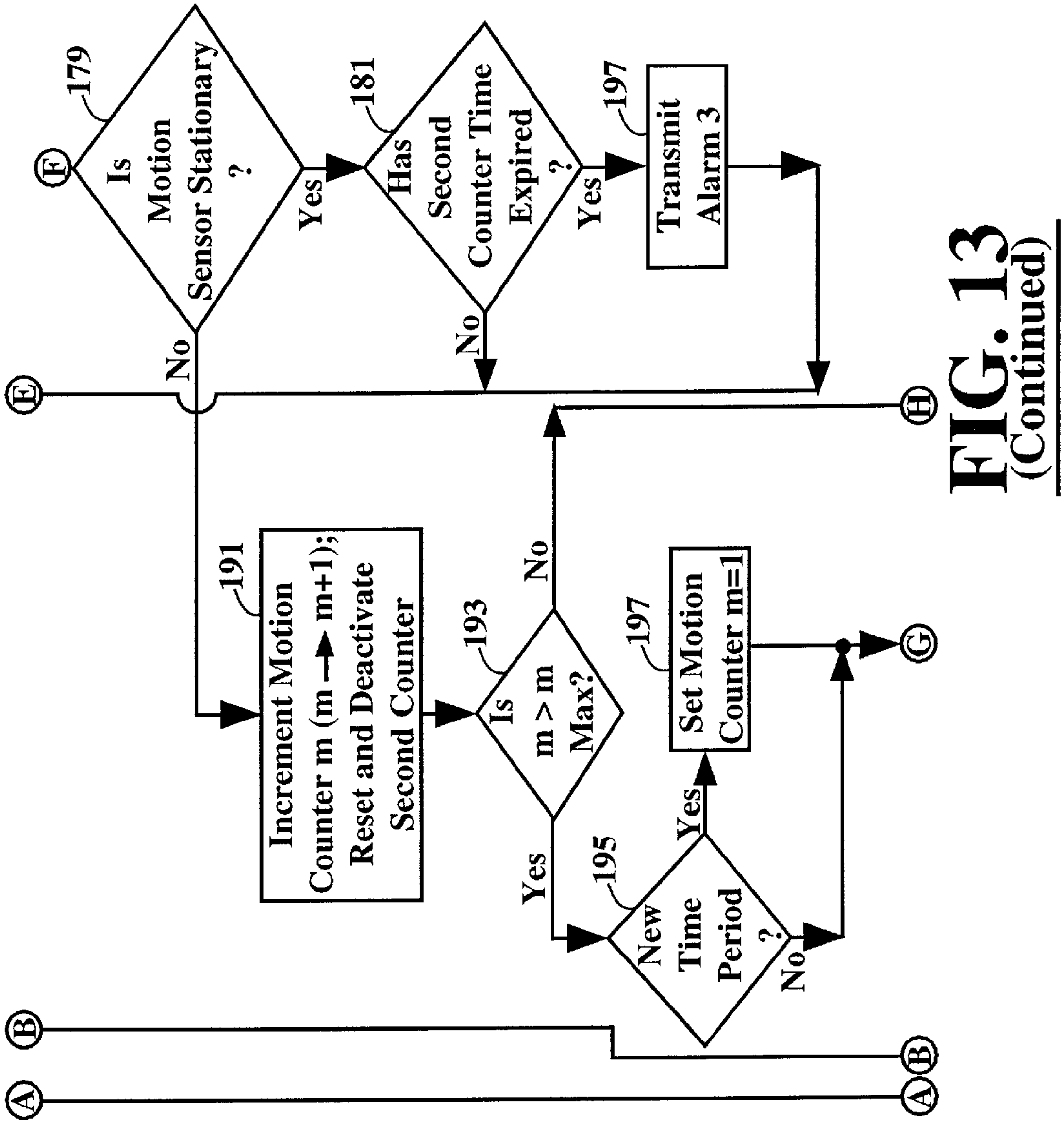
Figure 13:
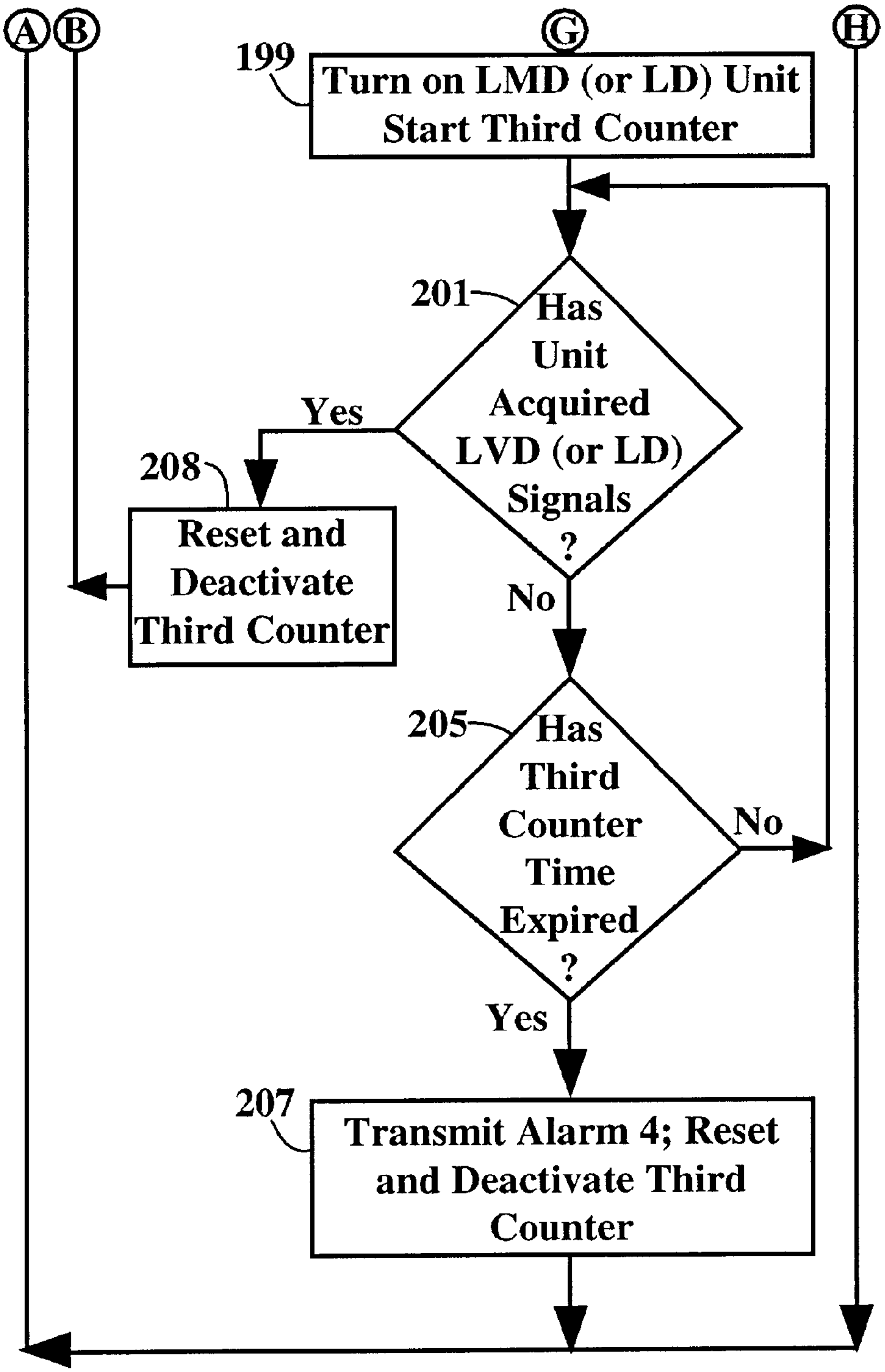

FIGS. 13A and 13B are schematic views of an LMD unit 221A and 221B that is suitable for practicing the embodiment(s) illustrated in the flow chart in FIG. 12. LD signals (GPS, GLONASS, Loran, FM subcarrier, etc.) are received at an LD signal antenna 223 and passed to an LD signal receiver/processor 225 for processing and determination of the present location of the LD signal antenna. The LMD unit 221A or 221B includes a motion sensor 227 and associated (optional) motion counter 229 that determines whether the LMD unit 221B or 221B is in motion and the number of times the motion sensor has been moved within a specified motion monitoring period, such as 24 hours. The LMD unit 221A or 221B also includes a timer unit 231 that contains first, second and third timers, which are (optionally) used in steps 167, 181, 205, respectively, in FIG. 12.

The LMD unit 221 A or 221 B further includes a localization signal generator 233 (221A in FIG. 13A) or a localization signal strength sensor 235 (221B in FIG. 13B) and an associated localization signal antenna 237, for transmitting or receiving the localization signal used in the embodiment illustrated in FIG. 12. As noted above, one of the localization signal generator 233 and localization signal sensor 235 is part of the LMD unit 221A or 221B, and the other of these devices is attached to and carried by the user 131 in FIG. 11.

The LMD unit 221A or 221B also includes an alarm signal transmitter 239 and associated antenna 241, for transmitting the first, second, third and/or fourth alarm signal as generated in the embodiment illustrated in FIG. 12. The components of the LMD unit 221A or 221B are powered by an electrical power source 243.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemeris for each identified SATPS satellite. The SATPS signal antenna and signal receiver/processor are part of the user segment of a particular SATPS, the Global Positioning System, as discussed in Logsdon, op. cit.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=154 f0 and f2=120 f0 of a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of f0=10.23 MHz.A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of 0.1 f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published for the U.S. Government by Rockwell International Corporation, Satellite Systems Division, Revision B, Jul. 3, 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, op. cit.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, . . . , 23) is the channel or satellite number. These frequencies lie in two bands at 1.597–1.617 GHz (L1') and 1,240–1,260 GHz (L2'). The L1' code is modulated by a C/A-code (chip rate=0.511 MHz) and by a P-code (chip rate=5.11 MHz). The L2' code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS), the Global Orbiting Navigation Satellite System (GLONASS) or ORBCOM, uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

What is claimed is:

1. A method for monitoring the location of a monitored person (MP) with reference to a permitted site, the method comprising the steps of:

(1) designating a site, having a connected and closed curve or surface of arbitrary shape as a site boundary, as a permitted site;

(2) permitting an MP to move on the permitted site;

(3) receiving location determination (LD) signals at an LD unit attached to the MP that allow determination of the present location of the MP;

(4) determining the present location of the MP, using the LD unit;

(5) when the MP is not on the permitted site at one or more of the location determination times, transmitting an alarm signal number 1;

(6) providing a signal generator that is attached to the MP's body and that, when activated, transmits a distinguishable electromagnetic signal;

(7) providing the MP with a motion sensor that, when the sensor is substantially motionless, issues a stationarity signal;

(8) when the MP is on the permitted site:

(8A) determining whether the LD unit is receiving LD signals;

(8B) when the LD unit is receiving LD signals, returning to step (4), and when the LD unit is not receiving LD signals, proceeding to step (8C);

(8C) issuing an advisory signal number 1 and causing a first timer to begin a countdown from an initial time $\Delta t1=\Delta t1$, max;

(8D) determining whether the motion sensor is issuing a stationarity signal;

(8E) when the first timer reaches the maximum accumulated time $\Delta t1=\Delta t1$, max and the motion sensor has not yet begun issuing a stationarity signal, transmitting an alarm signal number 2 and returning to step (8A);

(8F) when the motion sensor begins issuing a stationarity signal before the first timer reaches the maximum accumulated time $\Delta t1=\Delta t1$, max deactivating the LD unit, deactivating the first timer, resetting the first timer accumulated time to $\Delta t1=0$, activating the signal generator and causing the signal generator to transmit a distinguishable signal;

(8G) providing a signal sensor, positioned at a selected location, that receives the distinguishable signal from the activated signal generator and that assigns a range attribute value A, having a real number value, to the received signal that is an approximate measure of the distance between the signal generator and the signal sensor;

(8H) determining whether the range attribute value A for the distinguishable signal, received from the signal generator, is less than a selected range attribute threshold value $A_{thr}$, at a sequence of at least two times;

(8I) when $A \geqq A_{thr}$, continuing to compare the range attribute value A with the threshold value $A_{thr}$ and (8J) when $A<A_{thr}$ (8J-1) transmitting an advisory signal number 2 and causing a second timer to begin a second countdown from a time $\Delta t2=0$ to a second selected maximum accumulated countdown time of $\Delta t2=\Delta t2$, max;

(8J-2) when the second countdown has begun, the motion sensor is issuing a stationarity signal, and $\Delta t2<\Delta t2$, max continuing to compare the range attribute value A with the threshold value $A_{thr}$;

(8J-3) when the second countdown has begun, the motion sensor is issuing a stationarity signal, and $\Delta t2<\Delta t2$, max transmitting an alarm signal number 3, returning to step (8H);

(8J-4) when the second countdown has begun and the motion sensor is not issuing a stationarity signal, deactivating the second timer and resetting the second timer accumulated time to $\Delta t2=0$;

(8J-5) when the second countdown has begun and the motion sensor is not issuing a stationarity signal, activating the LD unit and causing a third timer to begin a countdown from an initial time $\Delta t3=0$ to a third selected maximum accumulated countdown time $\Delta t3=\Delta t3$, max;

(8J-6) when the second countdown has begun, the motion sensor is not issuing a stationarity signal and $\Delta t3 \leqq \Delta t3$, max determining if the LD unit has acquired LD signals;

(8J-7) when the second countdown has begun, the motion sensor is not issuing a stationarity signal and $\Delta t3 \leqq \Delta t3$, max and the LD unit has acquired LD signals, initializing and deactivating the third timer and returning to step (8A);

(8J-8) when the second countdown has begun, the motion sensor is not issuing a stationarity signal and $\Delta t3 \leqq \Delta t3$, max, and the LD unit has not acquired LD signals, returning to step (8J-6)]; and (8J-9) when the second countdown has begun, the motion sensor is not issuing a stationarity signal and $\Delta t3 \leqq \Delta t3$, max and the LD unit has not acquired LD signals, deactivating and initializing the third time counter, transmitting an alarm signal number 4 and returning to step (8A).

2. The method of claim 1, further comprising the step of providing locking means for locking at least one of said LD unit and said signal generator to the body of said MP so that at least one of said LD unit and said signal generator cannot be removed or disabled except by a special means for removal of at least one of said LD unit and of said signal generator.

3. The method of claim 1, further comprising the step of choosing LD signal sources from the class of sources consisting of Global Positioning System (GPS), Global Navigational Satellite System (GLONASS), ORBCOM, Loran, Omega, Decca, Tacan, JTIDS Relnav and Personal Location Reporting System (PLRS).

4. The method of claim 1, further comprising the steps of:

selecting an exclusion site, spaced apart from said permitted site, onto which said MP is not permitted to go; and when said MP is on the exclusion site at one or more of the location determination times, transmitting an alarm signal number 5.

5. The method of claim 4, further comprising the step of causing said LD unit to deliver to said MP's body a chemical that temporarily disables said MP, when said present location of said LD unit is determined to be within said exclusion site.

6. A method for monitoring the location of a monitored person (MP) with reference to a permitted site, the method comprising the steps of:

(1) designating a site, having a connected and closed curve or surface of arbitrary shape as a site boundary, as a permitted site;

(2) permitting an MP to move on the permitted site;

(3) receiving location determination (LD) signals at an LD signal receiver unit attached to the MP that allow determination of the present location of the MP;

(4) determining the present location of the MP, using the LD unit;

(5) when the MP is not on the permitted site at one or more of the location determination times, transmitting an alarm signal number 1;

(6) providing a signal generator that is attached to the MP's body and that, when activated, transmits a distinguishable electromagnetic signal;

(7) providing the MP with a motion sensor that, when the sensor is substantially motionless, issues a stationarity signal;

(8) when the MP is on the permitted site:

(8A) determining whether the LD unit is receiving LD signals;

(8B) when the LD unit is receiving LD signals, returning to step (4), and when the LD unit is not receiving LD signals, proceeding to step (8C);

(8C) issuing an advisory signal number 1 and causing a first timer to begin a countdown from an initial time $\Delta t1=\Delta t1$, max;

(8D) determining whether the motion sensor is issuing a stationarity signal;

(8E) when the first timer reaches the maximum accumulated time $\Delta t1=\Delta t1$, max and the motion sensor has not yet begun issuing a stationarity signal, transmitting an alarm signal number 2 and returning to step (8A);

(8F) when the motion sensor begins issuing a stationarity signal before the first timer reaches the maximum accumulated time $\Delta t1=\Delta t1$, max deactivating the LD unit, deactivating the first timer, resetting the first timer accumulated time to $\Delta t1=0$, activating the signal generator and causing the signal generator to transmit a distinguishable signal;

(8G) providing a signal sensor, positioned at a selected location, that receives the distinguishable signal from the activated signal generator and that assigns a range attribute value A, having a real number value, to the received signal that is an approximate measure of the distance between the signal generator and the signal sensor;

(8H) determining whether the range attribute value A for the distinguishable signal, received from the signal generator, is less than a selected range attribute threshold value $A_{thr}$, at a sequence of at least two times;

(8I) when $A \geqq A_{thr}$, continuing to compare the range attribute value A with the threshold value $A_{thr}$; and (8J) when $A<A_{thr}$:

(8J-1) transmitting an advisory signal number 2 and causing a second timer to begin a second countdown from a time $\Delta t2=0$ to a second selected maximum accumulated countdown time of $\Delta t2=\Delta t2$, max;

(8J-2) when the second countdown has begun, the motion sensor is issuing a stationarity signal, and $\Delta t2<\Delta t2$, max continuing to compare the range attribute value A with the threshold value $A_{thr}$;

(8J-3) when the second countdown has begun, the motion sensor is issuing a stationarity signal, and $\Delta t2<\Delta t2$, max transmitting an alarm number 3, returning to step (8H);

(8J-4) when the second countdown has begun and the motion sensor is not issuing a stationarity signal, deactivating the second timer and resetting the second timer accumulated time to $\Delta t2=0$;

(8J-5) when the second countdown has begun and the motion sensor is not issuing a stationarity signal, activating the LD unit and causing a third timer to begin a countdown from an initial time $\Delta t3=0$ to a third selected maximum accumulated countdown time $\Delta t3=\Delta t3$, max;

(8J-6) when the second countdown has begun, the motion sensor is not issuing a stationarity signal and $\Delta t3 \leqq \Delta t3$, max determining if the LD unit has acquired LD signals;

(8J-7) when the second countdown has begun, the motion sensor is not issuing a stationarity signal and $\Delta t3 \leqq \Delta t3$, max, and the LD unit has acquired LD signals, initializing and deactivating the third timer and returning to step (8A);

(8J-8) when the second countdown has begun, the motion sensor is not issuing a stationarity signal and $\Delta t3 \leqq \Delta t3$, max, and the LD unit has not acquired LD signals, returning to step (8J-6)]; and (8J-9) when the second countdown has begun, the motion sensor is not issuing a stationarity signal and $\Delta t3 \leqq \Delta t3$, max and the LD unit has not acquired LD signals, deactivating and initializing the third time counter, transmitting an alarm signal 4 and returning to step (8A).

7. The method of claim 6, further comprising the step of providing locking means for locking at least one of said LD unit and said signal sensor to the body of said MP so that at least one of said LD unit and said signal sensor cannot be removed or disabled except by a special means for removal of at least one of said LD unit and of said signal sensor.

8. The method of claim 6, further comprising the step of choosing LD signal sources from the class of sources consisting of Global Positioning System (GPS), Global Navigational Satellite System (GLONASS), ORBCOM, Loran, Omega, Decca, Tacan, JTIDS Relnav and Personal Location Reporting System (PLRS).

9. The method of claim 6, further comprising the steps of:

selecting an exclusion site, spaced apart from said permitted site, onto which said MP is not permitted to go; and when said MP is on the exclusion site at one or more of the location determination times, transmitting an alarm signal number 5.

10. The method of claim 9, further comprising the step of causing said LD unit to deliver to said MP's body a chemical that temporarily disables said MP, when said present location of said LD unit is determined to be within said exclusion site.

11. A method for monitoring the location of a monitored person (MP) with reference to a permitted site, the method comprising the steps of:

(1) designating a site, having a connected and closed curve or surface of arbitrary shape as a site boundary, as a permitted site;

(2) permitting an MP to move on the permitted site;

(3) receiving location determination (LD) signals at an LD unit attached to the MP that allow determination of the present location of the MP;

(4) determining the present location of the MP, using the LD unit;

(5) when the MP is not on the permitted site at one or more of the location determination times, transmitting an alarm signal number 1;

(6) providing a signal generator that is attached to the MP's body and that, when activated, transmits a distinguishable electromagnetic signal;

(7) providing the MP with a motion sensor that, when the sensor is substantially motionless, issues a stationarity signal;

(8) providing the motion sensor with a motion counter having an initial value m=1 and having a selected maximum value $m=m_{max}\geqq 1$;

(9) setting the motion counter value m=1; and

(10) when the MP is on the permitted site:

(10A) determining whether the LD unit is receiving LD signals;

(10B) when the LD unit is receiving LD signals, returning to step (3), and when the LD unit is not receiving LD signals, proceeding to step (10C);

(10C) issuing an advisory signal number 1 and causing a first timer to begin a countdown from an initial time Δt1=Δt1, max;

(10D) determining whether the motion sensor is issuing a stationarity signal;

(10E) when the first timer reaches the maximum accumulated time Δt1=Δt1, max and the motion sensor has not yet begun issuing a stationarity signal, transmitting an alarm signal number 2 and returning to step (8A);

(10F) when the motion sensor begins issuing a stationarity signal before the first timer reaches the maximum accumulated time Δt1=Δt1, max, deactivating the LD unit, deactivating the first timer, resetting the first timer accumulated time to Δt1=0, activating the signal generator and causing the signal generator to transmit a distinguishable signal;

(10G) providing a signal sensor, positioned at a selected location, that receives the distinguishable signal from the activated signal generator and that assigns a range attribute value A, having a real number value, to the received signal that is an approximate measure of the distance between the signal generator and the signal sensor;

(10H) determining whether the range attribute value A for the distinguishable signal, received from the signal generator, is less than a selected range attribute threshold value $A_{thr}$, at a sequence of at least two times;

(10I) when $A\geqq A_{thr}$, continuing to compare the range attribute value A with the threshold value $A_{thr}$; and (10J) when $A<A_{thr}$:

(10J-1) transmitting an advisory signal number 2 and causing a second timer to begin a second countdown from a time Δt2=0 to a second selected maximum accumulated countdown time of Δt2=Δt2, max;

(10J-2) when the second countdown has begun, the motion sensor is issuing a stationarity signal, and Δt2<Δt2, max continuing to compare the range attribute value A with the threshold value $A_{thr}$;

(10J-3) when the second countdown has begun, the motion sensor is issuing a stationarity signal, and Δt2<Δt2, max transmitting an alarm signal number 3, returning to step (10H);

(10J-4) when the second countdown has begun and the motion sensor is not issuing a stationarity signal, deactivating the second timer, resetting the second timer accumulated time to Δt2=0, replacing the motion counter value m by an incremented value m+1 and determining if the incremented value satisfies $m>m_{max}$;

(10J-5) when the second countdown has begun, the motion sensor is not issuing a stationarity signal and $m\leqq m_{max}$; returning to step (10A);

(10J-6) when the second countdown has begun, the motion sensor is not issuing a stationarity signal and $m>m_{max}$, determining if a new monitoring interval has begun;

(10J-7) when the second countdown has begun, the motion sensor is not issuing a stationarity signal, $m>m_{max}$ and a new monitoring interval has begun, resetting the motion counter to m=1, and proceeding to step (10J-9);

(10J-8) when the second countdown has begun, the motion sensor is not issuing a stationarity signal, $m>m_{max}$ and a new monitoring interval has not begun, proceeding to step (10J-9);

(10J-9) activating the LD unit and causing a third timer to begin a countdown from an initial time Δt3=0 to a third selected maximum accumulated countdown time Δt3=Δt3, max;

(10J-10) when the second countdown has begun, the motion sensor is not issuing a stationarity signal, $m>m_{max}$, a new monitoring interval has not begun and Δt3≦Δt3, max determining if the LD unit has acquired LD signals;

(10J-11) when the second countdown has begun, the motion sensor is not issuing a stationarity signal, $m>m_{max}$, a new monitoring interval has not begun, Δt3≦Δt3, max and the LD unit has acquired LD signals, initializing and deactivating the third timer and returning to step (10A);

(10J-12) when the second countdown has begun, the motion sensor is not issuing a stationarity signal, $m>m_{max}$, a new monitoring interval has not begun, Δt3≦Δt3, max and the LD unit has not acquired LD signals, returning to step (10J-10); and (10J-13) when the second countdown has begun, the motion sensor is not issuing a stationarity signal, $m>m_{max}$, a new monitoring interval has not begun, Δt3≦Δt3, max and the LD unit has not acquired LD signals, deactivating and initializing the third time counter, transmitting an alarm signal number 4 and returning to step (10A).

12. The method of claim 11, further comprising the step of providing locking means for locking at least one of said LD unit and said signal generator to the body of said MP so that at least one of said LD unit and said signal generator cannot be removed or disabled except by a special means for removal of at least one of said LD unit and of said signal generator.

13. The method of claim 11, further comprising the step of choosing LD signal sources from the class of sources consisting of Global Positioning System (GPS), Global Navigational Satellite System (GLONASS), ORBCOM, Loran, Omega, Decca, Tacan, JTIDS Relnav and Personal Location Reporting System (PLRS).

14. The method of claim 11, further comprising the steps of:

selecting an exclusion site, spaced apart from said permitted site, onto which said MP is not permitted to go; and when said MP is on the exclusion site at one or more of the location determination times, transmitting an alarm signal number 5.

15. The method of claim 14, further comprising the step of causing said LD unit to deliver to said MP's body a chemical that temporarily disables said MP, when said present location of said LD unit is determined to be within said exclusion site.

16. A method for monitoring the location of a monitored person (MP) with reference to a permitted site, the method comprising the steps of:

(1) designating a site, having a connected and closed curve or surface of arbitrary shape as a site boundary, as a permitted site;

(2) permitting an MP to move on the permitted site;

(3) receiving location determination (LD) signals at an LD unit attached to the MP that allow determination of the present location of the MP;

(4) determining the present location of the MP, using the LD unit;

(5) when the MP is not on the permitted site at one or more of the location determination times, transmitting an alarm signal number 1;

(6) providing a signal generator that is attached to the MP's body and that, when activated, transmits a distinguishable electromagnetic signal;

(7) providing the MP with a motion sensor that, when the sensor is substantially motionless, issues a stationarity signal;

(8) providing the motion sensor with a motion counter having an initial value m=1 and having a selected maximum value $m=m_{max}\leqq 1$;

(9) setting the motion counter value m=1; and

(10) when the MP is on the permitted site:

(10A) determining whether the LD unit is receiving LD signals;

(10B) when the LD unit is receiving LD signals, returning to step (3), and when the LD unit is not receiving LD signals, proceeding to step (10C);

(10C) issuing an advisory signal number 1 and causing a first timer to begin a countdown from an initial time $\Delta t1=\Delta t1$, max;

(10D) determining whether the motion sensor is issuing a stationarity signal;

(10E) when the first timer reaches the maximum accumulated time $\Delta t1=\Delta t1$, max and the motion sensor has not yet begun issuing a stationarity signal, transmitting an alarm signal number 2 and returning to step (10A);

(10F) when the motion sensor begins issuing a stationarity signal before the first timer reaches the maximum accumulated time $\Delta t1=\Delta t1$, max deactivating the LD unit, deactivating the first timer, resetting the first timer accumulated time to $\Delta t1=0$, and activating the signal generator and causing the signal generator to transmit a distinguishable signal;

(10G) providing a signal sensor, attached to the MP's body, that receives the distinguishable signal from the activated signal generator and that assigns a range attribute value A, having a real number value, to the received signal that is an approximate measure of the distance between the signal generator and the signal sensor;

(10H) determining whether the range attribute value A for the distinguishable signal, received from the signal generator, is less than a selected range attribute threshold value $A_{thr}$, at a sequence of at least two times;

(10I) when $A\geqq A_{thr}$, continuing to compare the range attribute value A with the threshold value $A_{thr}$; and (10J) when $A<A_{thr}$:

(10J-1) transmitting an advisory signal number 2 and causing a second timer to begin a second countdown from a time $\Delta t2=0$ to a second selected maximum accumulated countdown time of $\Delta t2=\Delta t2$, max;

(10J-2) when the second countdown has begun, the motion sensor is issuing a stationarity signal, and $\Delta t2<\Delta t2$, max continuing to compare the range attribute value A with the threshold value $A_{thr}$;

(10J-3) when the second countdown has begun, the motion sensor is issuing a stationarity signal, and $\Delta t2<\Delta t2$, max transmitting an alarm signal number 3, returning to step (10H);

(10J-4) when the second countdown has begun and the motion sensor is not issuing a stationarity signal, deactivating the second timer, resetting the second timer accumulated time to $\Delta t2=0$, replacing the motion counter value m by an incremented value m+1 and determining if the incremented value satisfies $m>m_{max}$;

(10J-5) when the second countdown has begun, the motion sensor is not issuing a stationarity signal and $m\leqq m_{max}$; returning to step (10A);

(10J-6) when the second countdown has begun, the motion sensor is not issuing a stationarity signal and $m>m_{max}$, determining if a new monitoring interval has begun;

(10J-7) when the second countdown has begun, the motion sensor is not issuing a stationarity signal, $m>m_{max}$ and a new monitoring interval has begun, resetting the motion counter to m=1, and proceeding to step (10J-9);

(10J-8) when the second countdown has begun, the motion sensor is not issuing a stationarity signal, $m>m_{max}$ and a new monitoring interval has not begun, proceeding to step (10J-9);

(10J-9) activating the LD unit and causing a-third timer to begin a countdown from an initial time $\Delta t3=0$ to a third selected maximum accumulated countdown time $\Delta t3=\Delta t3$, max;

(10J-10) when the second countdown has begun, the motion sensor is not issuing a stationarity signal, $m>m_{max}$, a new monitoring interval has not begun and $\Delta t3\leqq\Delta t3$, max determining if the LD unit has acquired LD signals;

(10J-11) when the second countdown has begun, the motion sensor is not issuing a stationarity signal, $m>m_{max}$, a new monitoring interval has not begun, $\Delta t3\leqq\Delta t3$, max and the LD unit has acquired LD signals, initializing and deactivating the third timer and returning to step (10A);

(10J-12) when the second countdown has begun, the motion sensor is not issuing a stationarity signal, $m>m_{max}$, a new monitoring interval has not begun, $\Delta t3\leqq\Delta t3$, max and the LD unit has not acquired LD signals, returning to step (10J-10); and (10J-13) when the second countdown has begun, the motion sensor is not issuing a stationarity signal, $m>m_{max}$, a new monitoring interval has not begun, $\Delta t3\leqq\Delta t3$, max and the LD unit has not acquired LD signals, deactivating and initializing the third time counter, transmitting an alarm signal number 4 and returning to step (10A).

17. The method of claim 16, further comprising the step of providing locking means for locking at least one of said LD unit and said signal sensor to the body of said MP so that at least one of said LD unit and said signal sensor cannot be removed or disabled except by a special means for removal of at least one of said LD unit and of said signal sensor.

18. The method of claim 16, further comprising the step of choosing LD signal sources from the class of sources consisting of Global Positioning System (GPS), Global Navigational Satellite System (GLONASS), ORBCOM, Loran, Omega, Decca, Tacan, JTIDS Relnav and Personal Location Reporting System (PLRS).

19. The method of claim 16, further comprising the steps of:

selecting an exclusion site, spaced apart from said permitted site, onto which said MP is not permitted to go; and when said MP is on the exclusion site at one or more of the location determination times, transmitting an alarm signal number 5.

20. The method of claim 19, further comprising the step of causing said LD unit to deliver to said MP's body a chemical that temporarily disables said MP, when said present location of said LD unit is determined to be within said exclusion site.

21. The method of claim 1, further comprising the steps of:

(9) designating a second site, having a connected and closed curve or surface of arbitrary shape as a site boundary and being spaced apart from said first permitted site, as a second permitted site;

(10) selecting a corridor that extends between and is connected to the first site and the second site, where the combined region consisting of said first permitted site, the second permitted site and the corridor has a closed continuous curve of arbitrary shape as a combined region boundary;

(11) redefining, for a first selected time interval, the permitted site to include said first permitted site, the second permitted site and the corridor; and redefining, for a second selected time interval the permitted site to include at least one of said first permitted site and the second permitted site.

22. The method of claim 6, further comprising the steps of:

(9) designating a second site, having a connected and closed curve or surface of arbitrary shape as a site boundary and being spaced apart from said first permitted site, as a second permitted site;

(10) selecting a corridor that extends between and is connected to the first site and the second site, where the combined region consisting of said first permitted site, the second permitted site and the corridor has a closed continuous curve of arbitrary shape as a combined region boundary;

(11) redefining, for a first selected time interval, the permitted site to include said first permitted site, the second permitted site and the corridor; and redefining, for a second selected time interval the permitted site to include at least one of said first permitted site and the second permitted site.

23. The method of claim 11, further comprising the steps of:

(11) designating a second site, having a connected and closed curve or surface of arbitrary shape as a site boundary and being spaced apart from said first permitted site, as a second permitted site;

(12) selecting a corridor that extends between and is connected to the first site and the second site, where the combined region consisting of said first permitted site, the second permitted site and the corridor has a closed continuous curve of arbitrary shape as a combined region boundary;

(13) redefining, for a first selected time interval, the permitted site to include said first permitted site, the second permitted site and the corridor; and redefining, for a second selected time interval the permitted site to include at least one of said first permitted site and the second permitted site.

24. The method of claim 16, further comprising the steps of:

(11) designating a second site, having a connected and closed curve or surface of arbitrary shape as a site boundary and being spaced apart from said first permitted site, as a second permitted site;

(12) selecting a corridor that extends between and is connected to the first site and the second site, where the combined region consisting of said first permitted site, the second permitted site and the corridor has a closed continuous curve of arbitrary shape as a combined region boundary;

(13) redefining, for a first selected time interval, the permitted site to include said first permitted site, the second permitted site and the corridor; and redefining, for a second selected time interval the permitted site to include at least one of said first permitted site and the second permitted site.

25. A method for monitoring the location of a monitored person (MP) with reference to a permitted site, the method comprising the steps of:

(1) receiving location determination (LD) signals at an LD unit attached to an MP who moves on a selected permitted site, and determining the present location of the MP, using the LD unit, at one or more selected LD times;

(2) when the MP's location is not on the permitted site at each of a selected number N of consecutive LD times, transmitting a first alarm signal;

(3) attaching to the MP's body a motion sensor that senses when the sensor is in motion;

(4) when the MP's last location was on the permitted site and the LD unit does not receive LD signals adequate for determining the MP's present location, determining whether the motion sensor senses motion; and (5) when (i) the motion sensor senses motion and (ii) the LD unit does not receive LD signals, determining a first accumulated time during which the two conditions (i) and (ii) both occur, and issuing a second alarm signal when the first accumulated time reaches a selected maximum accumulated time $\Delta t1,_{max}$;

(6) when said motion sensor becomes substantially motionless before said first accumulated time reaches said time Δt1, max, resetting said first accumulated time to a selected initial value and causing a signal generator, attached to the MP's body to transmit a distinguishable signal;

(7) receiving the distinguishable signal at a signal sensor, positioned at a selected location, and comparing an attribute for this signal with a selected attribute threshold value;

(8) when the signal attribute is not greater than the threshold value, returning to step (7);

(9) when the signal attribute is at least equal to the threshold value determining a second accumulated time during which the signal attribute is at least equal to the threshold value:

(10) When the second accumulated time reaches a second selected maximum accumulated time Δt2, max issuing a third alarm signal; and

(11) when said attribute value becomes less than said attribute threshold value before said second accumulated time reaches said time Δt2, max resetting said second accumulated time to zero.

26. A method for monitoring the location of a monitored person (MP) with reference to a permitted site, the method comprising the steps of:

(1) receiving location determination (LD) signals at an LD unit attached to an MP who moves on a selected permitted site, and determining the present location of the MP, using the LD unit;

(2) when the MP is not on the permitted site at one or more of the location determination times, transmitting a first alarm signal;

(3) providing the MP with a motion sensor that senses when the sensor is in motion and when the sensor is substantially motionless;

(4) when the MP is on the permitted site and the LD unit does not receive LD signals adequate for determining the MP's present location, determining whether the motion sensor senses motion;

(5) when (i) the motion sensor senses motion and (ii) the LD unit does not receive LD signals, determining a first accumulated time during which the two conditions (i) and (ii) both occur, and when the first accumulated time $\Delta t_{1,max}$, issuing a second alarm signal;

(6) when the motion sensor becomes substantially motionless before the first accumulated time reaches the $\Delta t_{1,max}$, resetting the first accumulated time to a selected initial value and causing a signal generator, attached to the MP's body to transmit a distinguishable signal;

(7) receiving the distinguishable signal at a signal sensor, positioned at a selected location, and estimating a distance between the signal generator and the signal sensor;

(8) when the estimated distance is no greater than a selected distance threshold value, returning to step (7);

(9) when the estimated distance is greater than the distance threshold value, determining a second accumulated time during which the estimated distance is greater than the distance threshold value;

(10) when the second accumulated time reaches a second selected maximum accumulated time $\Delta t_{1,max}$, issuing a third alarm signal; and

(11) when the estimated distance becomes less than the distance threshold value before the second accumulated time reaches the time $\Delta t_{1,max}$, resetting the second accumulated time to zero.

27. A method for monitoring the location of a monitored person (MP) with reference to a permitted site, the method comprising the steps of:

(1) receiving location determination (LD) signals at an LD unit attached to an MP that moves on a selected permitted site, and determining the present location of the MP, using the LD unit;

(2) when the MP is not on the permitted site at one or more of the location determination times, transmitting a first alarm signal;

(3) providing the MP with a motion sensor that senses when the sensor is in motion and when the sensor is substantially motionless;

(4) when the MP is on the permitted site and the LD unit does not receive LD signals for determining the MP's present location, determining whether the motion sensor senses motion;

(5) when (i) the motion sensor senses motion and (ii) the LD unit does not receive LD signals, determining a first accumulated time during which the conditions (i) and (ii) both occur, and when the first accumulated reaches a first selected maximum accumulated time $\Delta t_{1,max}$, issuing a second alarm signal;

(6) when the motion sensor becomes substantially motionless before the first accumulated time reaches the $\Delta t_{1,max}$, resetting the first accumulated time to a selected initial value and causing a signal generator, positioned at a selected location, to transmit a distinguishable signal;

(7) receiving the distinguishable signal at a signal sensor, attached to the MP's body, and estimating a distance between the signal generator and the signal sensor;

(8) when the estimated distance is no greater than a selected distance threshold value, returning to step (7);

(9) when the estimated distance is greater than the distance threshold value, determining a second accumulated time during which the estimated distance is greater than the distance threshold value;

(10) when the second accumulated time reaches a second selected maximum accumulated time $\Delta t_{2,max}$, issuing a third alarm signal; and

(11) when the estimated distance becomes less than the distance threshold value before the second accumulated time reaches the time $\Delta t_{2,max}$, resetting the second accumulated time to zero.

28. A method for monitoring the location of a monitored person (MP) with reference to a permitted site, the method comprising the steps of:

(1) receiving location determination (LD) signals at an LD unit attached to an. MP who moves on a selected permitted site, and determining the present location of the MP, using the LD unit, at one or more selected LD times;

(2) when the MP's location is not on the permitted site at each of a selected number N of consecutive LD times, transmitting a first alarm signal;

(3) attaching to the MP's body a motion sensor that senses when the sensor is in motion;

(4) when the MP's last location was on the permitted site and the LD unit does not receive LD signals adequate for determining the MP's present location, determining whether the motion sensor senses motion; and (5) when (i) the motion sensor senses motion and (ii) the LD unit does not receive LD signals, determining a first accumulated time during which the two conditions (i) and (ii) both occur, and issuing a second alarm signal when the first accumulated time reaches a selected maximum accumulated time $\Delta t1,_{max}$;

(6) when said motion sensor becomes substantially motionless before said first accumulated time reaches said time Δt1, max resetting said first accumulated time to a selected initial value and causing a signal generator, positioned at a selected location, to transmit a distinguishable signal;

(7) receiving the distinguishable signal at a signal sensor, positioned at a selected location, and comparing an attribute for this signal with a selected attribute threshold value;

(8) when the signal attribute is not greater than the threshold value, returning to step (7);

(9) when the signal attribute is at least equal to the threshold value, determining a second accumulated time during which the signal attribute is at least equal to the threshold value; and

(10) When the second accumulated time reaches a second selected maximum accumulated time $\Delta t2$, max issuing a third alarm signal; and

(11) when said attribute value becomes less than said attribute threshold value before said second accumulated time reaches said time $\Delta t2$, max resetting said second accumulated time to zero.

* * * * *